United States Patent
Yoon et al.

(10) Patent No.: US 11,430,249 B2
(45) Date of Patent: Aug. 30, 2022

(54) PASSIVE ACOUSTIC FINGERPRINT SENSOR

(71) Applicant: QUALCOMM Incorporated, San Diego, CA (US)

(72) Inventors: Soon Joon Yoon, San Jose, CA (US); Hrishikesh Vijaykumar Panchawagh, Cupertino, CA (US); Jessica Liu Strohmann, Cupertino, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 16/427,165

(22) Filed: May 30, 2019

(65) Prior Publication Data

US 2020/0380232 A1 Dec. 3, 2020

(51) Int. Cl.
*G06V 40/13* (2022.01)
*G01H 11/08* (2006.01)
*G06F 21/32* (2013.01)
*G06V 40/12* (2022.01)

(52) U.S. Cl.
CPC ......... *G06V 40/1306* (2022.01); *G01H 11/08* (2013.01); *G06F 21/32* (2013.01); *G06V 40/1347* (2022.01)

(58) Field of Classification Search
CPC .. G06K 9/0002; G06K 9/00067; G06F 21/32; G01H 11/08
See application file for complete search history.

(56) References Cited

U.S. PATENT DOCUMENTS

| | | | |
|---|---|---|---|
| 10,262,188 B2 | 4/2019 | Agassy et al. | |
| 2017/0323133 A1* | 11/2017 | Tsai | B06B 1/0622 |
| 2018/0101711 A1* | 4/2018 | D'Souza | G06K 9/228 |
| 2018/0348853 A1* | 12/2018 | Shchur | G06F 3/04883 |

FOREIGN PATENT DOCUMENTS

WO 2017142912 A1 8/2017

OTHER PUBLICATIONS

International Search Report and Written Opinion—PCT/US2020/070078—ISA/EPO—dated Aug. 27, 2020.

* cited by examiner

*Primary Examiner* — Jonathan A Boyd

(74) *Attorney, Agent, or Firm* — Thien T. Nguyen

(57) ABSTRACT

An acoustic receiver system may be configured for receiving dynamic friction acoustic waves produced via relative motion between an outer surface of an apparatus and a target object in contact with the outer surface. A control system may be configured for receiving acoustic signals from the acoustic receiver system. The acoustic signals may correspond to a first instance of the dynamic friction acoustic waves. The control system may be configured for extracting target object features from the first acoustic signals and for performing an authentication process based, at least in part, on the target object features.

30 Claims, 17 Drawing Sheets

*Figure 3F*
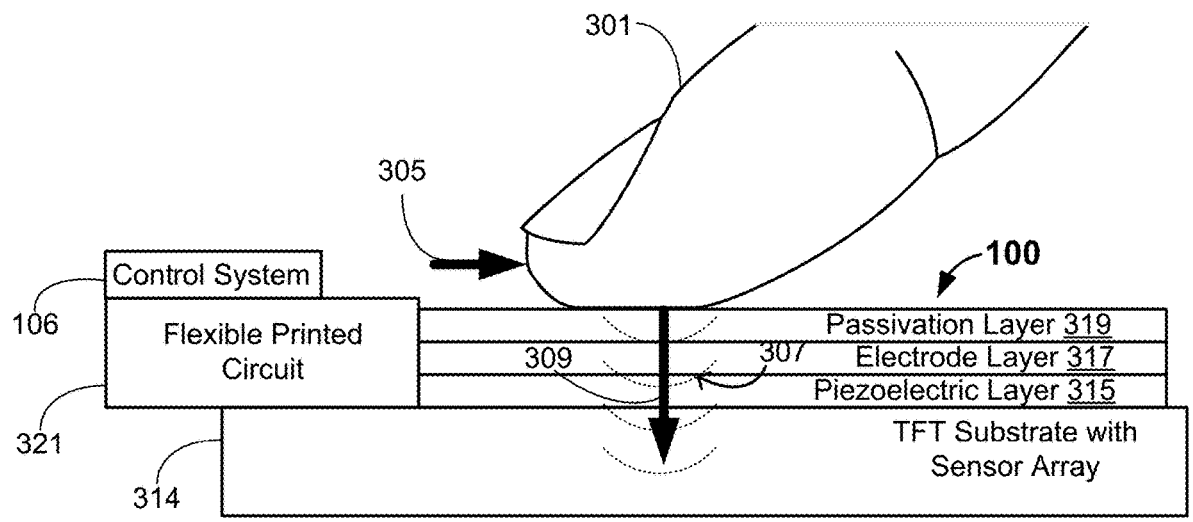
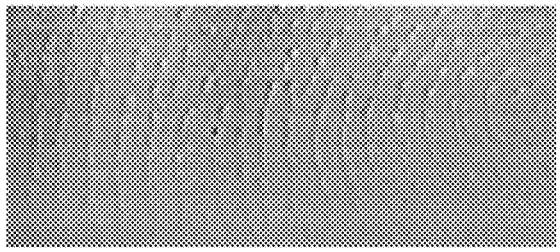
*Figure 3G*
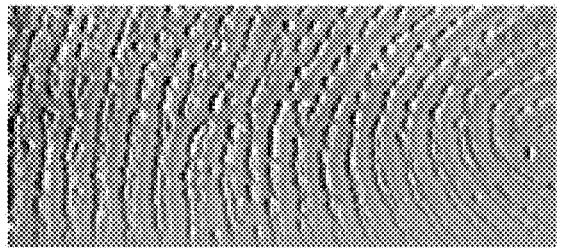
*Figure 3H*
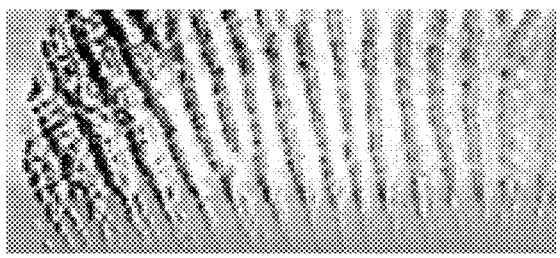
*Figure 3I*
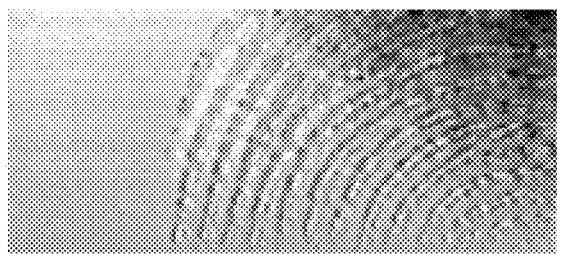
*Figure 3J*

PASSIVE ACOUSTIC FINGERPRINT SENSOR

TECHNICAL FIELD

This disclosure relates generally to sensor devices and related methods, including but not limited to piezoelectric sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an acoustic receiver system and a control system that is configured for communication with the acoustic receiver system. The acoustic receiver system may be configured for receiving dynamic friction acoustic waves produced via relative motion between an outer surface of the apparatus and a target object in contact with the outer surface. In some examples, at least a portion of the control system may be coupled to the acoustic receiver system.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for receiving first acoustic signals from the acoustic receiver system. The first acoustic signals may correspond to a first instance of the dynamic friction acoustic waves. In some instances, the control system may be configured for extracting first target object features from the first acoustic signals and for performing a first authentication process that is based, at least in part, on the first target object features. In some instances, the first target object features may be, or may include, fingerprint features. In some implementations, the control system may be further configured for controlling access to the apparatus, or to another device, based at least in part on the first authentication process.

According to some examples, the acoustic receiver system may include an ultrasonic receiver system. In some examples, the acoustic receiver system may include a piezoelectric receiver system. The apparatus may, in some instances, include a user input device. In some such instances, the acoustic receiver system may reside in or on the user input device. The apparatus may, in some examples, include a display. In some such examples, the acoustic receiver system may reside proximate a first side of the display. According to some such examples, the outer surface may be proximate a second side of the display.

In some implementations, a mobile device may be, or may include, the apparatus. For example, a mobile device may include an apparatus as disclosed herein. According to some examples, a display device may include the apparatus. In some instances, an Internet of things device may include the apparatus.

Some implementations may include a layer between the outer surface of the apparatus and the acoustic receiver system. In some such examples, the layer may include metal, plastic, ceramic and/or polymer.

In some implementations, the control system may be further configured for receiving second through Nth acoustic signals from the acoustic receiver system. The second through Nth acoustic signals may correspond to second through Nth instances of the dynamic friction acoustic waves. The control system may be configured for extracting second through Nth target object features from each of the second through Nth acoustic signals and for performing second through Nth authentication processes based, at least in part, on the first target object features. The control system may be configured for controlling access to the apparatus, or to the other device, based at least in part on the second through Nth authentication processes.

According to some implementations, the apparatus does not include a transmitter corresponding to the acoustic receiver. In some examples, the apparatus includes a transmitter corresponding to the acoustic receiver, but the transmitter is not transmitting during the time (or immediately prior to the time) the acoustic receiver system is receiving the dynamic friction acoustic waves.

Some innovative aspects of the subject matter described in this disclosure may be implemented in a method. In some instances, the method may involve receiving, via an acoustic receiver system of an apparatus, dynamic friction acoustic waves produced via relative motion between an outer surface of the apparatus and a target object in contact with the outer surface. The method may involve receiving, via a control system that includes one or more processors, first acoustic signals from the acoustic receiver system. The first acoustic signals may correspond to a first instance of the dynamic friction acoustic waves. The method may involve extracting, via the control system, first target object features from the first acoustic signals and performing, via the control system, a first authentication process based, at least in part, on the first target object features. In some examples, the first target object features may be, or may include, fingerprint features. In some instances, the method may involve controlling access to the apparatus, or to another device, based at least in part on the first authentication process.

In some instances, the dynamic friction acoustic waves may pass through a layer between the target object and the acoustic receiver system. The layer may include metal, plastic, ceramic and/or polymer.

In some instances, the method may involve receiving second through Nth acoustic signals from the acoustic receiver system. The second through Nth acoustic signals may correspond to second through Nth instances of the dynamic friction acoustic waves. The method may involve extracting second through Nth target object features from each of the second through Nth acoustic signals, performing second through Nth authentication processes based, at least in part, on the first target object features and controlling access to the apparatus, or to another device, based at least in part on the second through Nth authentication processes.

In some examples, the apparatus includes a transmitter corresponding to the acoustic receiver, but the method involves not causing the transmitter to transmit during the time (or immediately before the time) the acoustic receiver system is receiving the dynamic friction acoustic waves.

Some innovative aspects of the subject matter described in this disclosure may be implemented via one or more non-transitory media having software stored thereon. The one or more non-transitory media may, for example, include random access memory (RAM), read-only memory (ROM), CD-ROM or other optical disk storage, magnetic disk storage or other magnetic storage devices, or any other medium that may be used to store desired program code in the form of instructions or data structures and that may be accessed by a computer. Additionally, the operations of a method or algorithm may reside as one or any combination or set of codes and instructions on a machine readable medium and computer-readable medium, which may be incorporated into a computer program product.

According to some implementations, one or more non-transitory media may have software for controlling one or more devices to perform a method stored thereon. In some instances, the method may involve receiving, via an acoustic receiver system of an apparatus, dynamic friction acoustic waves produced via relative motion between an outer surface of the apparatus and a target object in contact with the outer surface. The method may involve receiving, via a control system that includes one or more processors, first acoustic signals from the acoustic receiver system. The first acoustic signals may correspond to a first instance of the dynamic friction acoustic waves. The method may involve extracting, via the control system, first target object features from the first acoustic signals and performing, via the control system, a first authentication process based, at least in part, on the first target object features. In some examples, the first target object features may be, or may include, fingerprint features. In some instances, the method may involve controlling access to the apparatus, or to another device, based at least in part on the first authentication process.

In some instances, the dynamic friction acoustic waves may pass through a layer between the target object and the acoustic receiver system. The layer may include metal, plastic, ceramic and/or polymer.

In some instances, the method may involve receiving second through Nth acoustic signals from the acoustic receiver system. The second through Nth acoustic signals may correspond to second through Nth instances of the dynamic friction acoustic waves. The method may involve extracting second through Nth target object features from each of the second through Nth acoustic signals, performing second through Nth authentication processes based, at least in part, on the first target object features and controlling access to the apparatus, or to another device, based at least in part on the second through Nth authentication processes.

In some examples, the apparatus includes a transmitter corresponding to the acoustic receiver, but the method involves not causing the transmitter to transmit during the time (or immediately before the time) the acoustic receiver system is receiving the dynamic friction acoustic waves.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 3F shows a target object swiping the bottom surface of the same type of apparatus that is shown in FIG. 3A.

FIG. 3G is a grayscale image corresponding to acoustic signals received by the device illustrated in FIG. 3F.

FIG. 3H is another grayscale image corresponding to acoustic signals received by the device illustrated in FIG. 3F.

FIG. 3I is another grayscale image corresponding to acoustic signals received by the device illustrated in FIG. 3F.

FIG. 3J is another grayscale image corresponding to acoustic signals received by the device illustrated in FIG. 3F.

DETAILED DESCRIPTION

Figure 1:
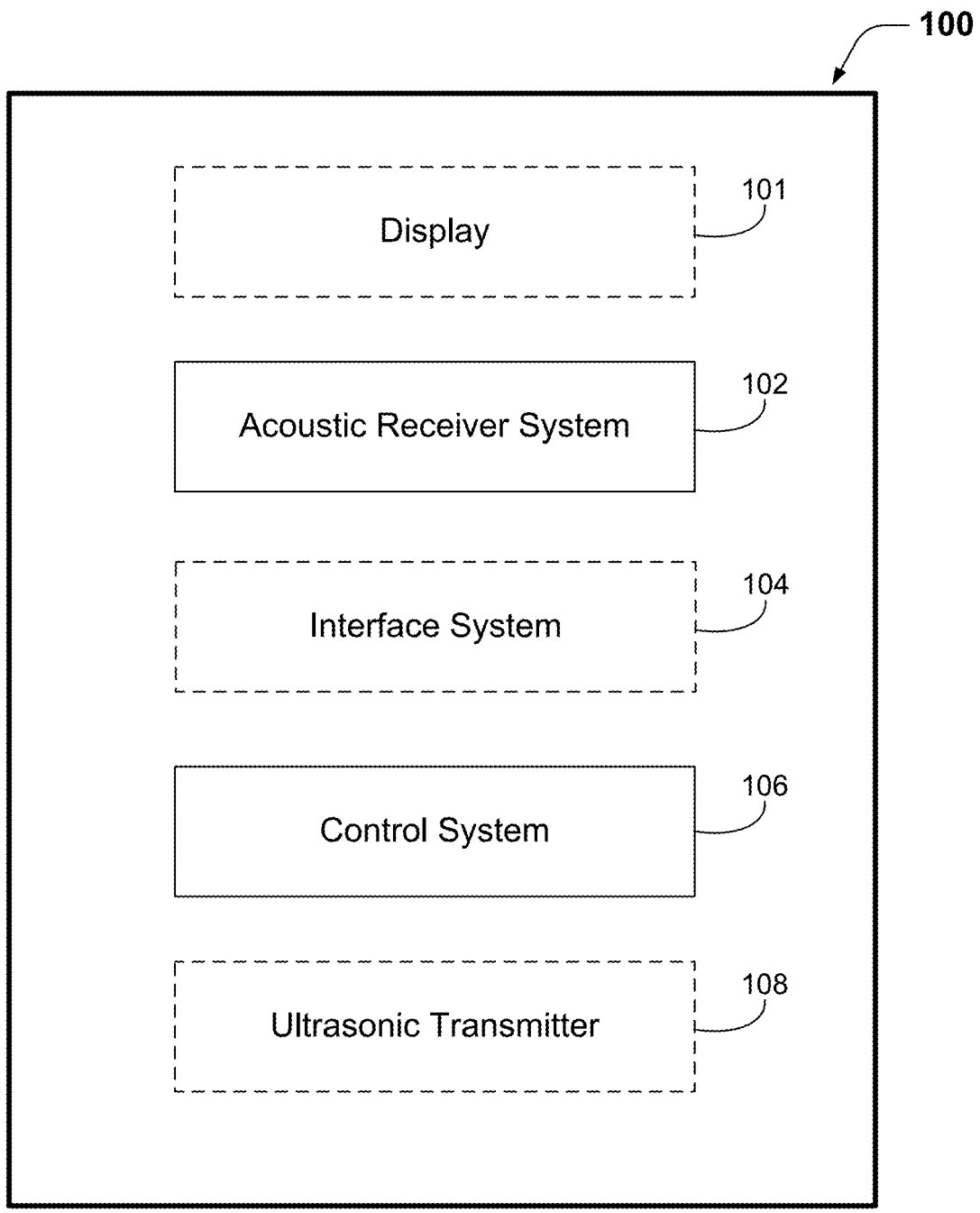
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some disclosed devices include a passive acoustic fingerprint sensor that includes an acoustic receiver system. Such devices may or may not include a transmitter that corresponds to the acoustic receiver system, depending on the particular implementation. Accordingly, in some implementations the acoustic receiver system may be configured to detect a fingerprint image without the need to transmit acoustic waves towards a finger. In some implementations, the acoustic receiver system may be configured to detect acoustic waves generated when a target object, such as a finger, is swiped across an outer surface of the device.

In some examples, the acoustic receiver system may be configured for receiving dynamic friction acoustic waves produced via relative motion between an outer surface of an apparatus and a target object, such as a finger, in contact with the outer surface. A control system may be configured for receiving acoustic signals from the acoustic receiver system. The acoustic signals may correspond to a first instance of the dynamic friction acoustic waves. The control system may be configured for extracting target object features from the first acoustic signals and for performing an authentication process based, at least in part, on the target object features.

The control system may, for example be configured for controlling access to the apparatus, or to another device, based at least in part on the first authentication process. In some implementations, the control system may be configured to perform a periodic authentication process for controlling access to the apparatus, or to another device.

Particular implementations of the subject matter described in this disclosure may be implemented to realize one or more of the following potential advantages. In some examples, the acoustic receiver system may save power that would otherwise be used to generate acoustic waves, such as ultrasonic waves, via a transmitter. According to some such examples, the apparatus may be provided at a lower cost because the apparatus lacks an ultrasonic transmitter, an optical transmitter, associated drive circuitry, etc. Some such configurations may have a relatively longer lifetime and/or increased reliability due to the lack of such devices. In addition, such configurations may be relatively easier to scale to large-area sensor implementations, because large-area transmitter designs can be challenging to implement. Moreover, dry fingers are generally difficult to image with a typical ultrasonic sensor or a typical optical sensor. Detecting fingerprint images that result from finger swiping can be helpful when imaging dry fingers, which are relatively rougher and create more friction and acoustic signals than oily, wet or normal fingers. In addition, some such implementations may provide enhanced security because swiping a finger may not leave fingerprint residue on the outer surface of the apparatus.

FIG. 1 is a block diagram that shows example components of an apparatus according to some disclosed implementations. In this implementation, the apparatus 100 includes an acoustic receiver system 102 and a control system 106. In some examples, the acoustic receiver system 102 may be, or may include, a piezoelectric receiver array. According to some examples, the acoustic receiver system 102 may be, or may include, an ultrasonic receiver array. In alternative examples, the acoustic receiver system 102 may operate in a range of frequencies that includes frequencies outside the ultrasonic range, such as frequencies within the range of human hearing. Moreover, in some examples the acoustic receiver system 102 may not be, or may not include, a piezoelectric receiver array. For example, the acoustic receiver system 102 may include a capacitive micromachined ultrasonic transducer (CMUT) array.

Although not shown in FIG. 1, the apparatus 100 may include other components, such as a cover glass, a sensor substrate, etc. Some examples are described below.

In some examples, the apparatus 100 may include an optional display 101 and/or an optional ultrasonic transmitter 108. The acoustic receiver system 102 may, in some implementations, reside under the display 101.

Various examples of apparatus 100 are disclosed herein, some of which may include a separate transmitter (such as a separate ultrasonic transmitter 108 or a separate optical transmitter configured to cause a photoacoustic response in a target object) and some of which may not. Although shown as separate elements in FIG. 1, in some implementations the acoustic receiver system 102 and the ultrasonic transmitter 108 may be combined in an ultrasonic transceiver. For example, in some implementations, the acoustic receiver system 102 may include a piezoelectric receiver layer, such as a layer of PVDF polymer or a layer of PVDF-TrFE copolymer. In some implementations, a separate piezoelectric layer may serve as the ultrasonic transmitter. In some implementations, a single piezoelectric layer may serve as the transmitter and as a receiver. In some implementations, other piezoelectric materials may be used in the piezoelectric layer, such as aluminum nitride (AlN) or lead zirconate titanate (PZT). The acoustic receiver system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some alternative examples, the acoustic receiver system 102 may be an ultrasonic receiver array and the ultrasonic transmitter 108 may include one or more separate elements. In some such examples, the ultrasonic transmitter 108 may include an ultrasonic plane-wave generator, such as those described below.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 106 may be capable of receiving and processing data from the acoustic receiver system 102, e.g., as described below. If the apparatus 100 includes an ultrasonic transmitter 108, the control system 106 may be capable of controlling the ultrasonic transmitter 108, e.g., as disclosed elsewhere herein. In some implementations, functionality of the control system 106 may be partitioned between one or more controllers or processors, such as a dedicated sensor controller and an applications processor of a mobile device.

Some implementations of the apparatus 100 may include an interface system 104. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 100. In some such examples, the interface system 104 may be configured to provide communication between the control system 106 and the acoustic receiver system 102. According to some such examples, a portion of the interface system 104 may couple at least a portion of the control system 106 to the acoustic receiver system 102, e.g., via electrically conducting material. If the apparatus 100 includes an ultrasonic transmitter 108 that is separate from the acoustic receiver system 102, the interface system 104 may be configured to provide communication between at least a portion of the control system 106 and the ultrasonic transmitter 108.

According to some examples, the interface system 104 may be configured to provide communication between the apparatus 100 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces). In some implementations, the apparatus 100 may include a memory system. The interface system 104 may, in some examples, include at least one interface between the control system 106 and a memory system.

The apparatus 100 may be used in a variety of different contexts, many examples of which are disclosed herein. For example, in some implementations a mobile device, such as a cell phone, a smart phone, a tablet, a laptop (e.g., a laptop touchpad), etc., may include at least a portion of the apparatus 100. In some implementations, a wearable device may include at least a portion of the apparatus 100. The wearable device may, for example, be a watch, a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer). The interface system 104 also may, in some such examples, reside in more than one device.

Figure 2:
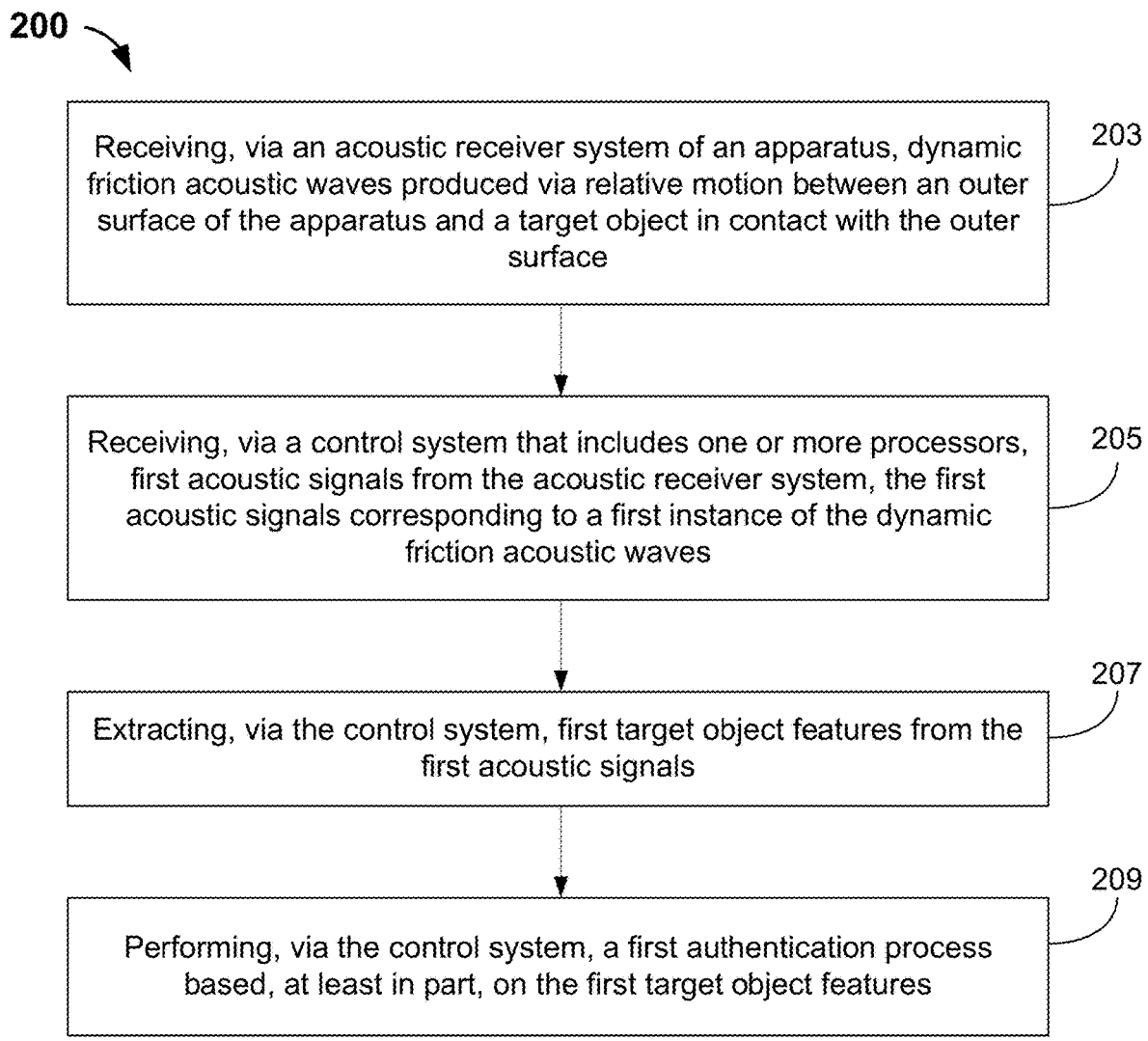
FIG. 2 is a flow diagram that provides examples of operations according to some disclosed methods.

FIG. 2 is a flow diagram that provides examples of operations according to some disclosed methods. The blocks of FIG. 2 may, for example, be performed by the apparatus 100 of FIG. 1, 3A, 3F, 3K or 4, or by a similar apparatus. As with other methods disclosed herein, the method outlined in FIG. 2 may include more or fewer blocks than indicated. Moreover, the blocks of methods disclosed herein are not necessarily performed in the order indicated.

In this example, block 203 involves receiving, via an acoustic receiver system of an apparatus, dynamic friction acoustic waves produced via relative motion between an outer surface of the apparatus and a target object in contact with the outer surface. In some examples, the dynamic friction acoustic waves may be produced by a finger sliding across the outer surface of the apparatus.

The acoustic receiver system may, in some examples, include a piezoelectric receiver array. Alternatively, or additionally, the acoustic receiver system may include an ultrasonic receiver system. In some instances, a display may reside between the outer surface of the apparatus and a target object. Various examples of piezoelectric receiver arrays that reside under a display are disclosed herein.

In some examples, the apparatus may include a user input device. According to some such examples, the acoustic receiver system may reside in or on the user input device.

According to some implementations, the apparatus may include a display. In some such examples, the acoustic receiver system may reside near a first side of the display and the outer surface of the apparatus, with which the target object is in contact, may be proximate a second side of the display. According to some such implementations, a person may slide his or her finger across a portion of the outer surface of the apparatus in response to a visual and/or audio prompt. For example, a person may slide his or her finger across a portion of the surface of the apparatus corresponding to a portion of the display in which a prompt such as "slide finger here" is displayed. In some such examples, the prompt may indicate a direction in which the finger should slide and/or an area of the display in which the finger should slide.

According to this implementation, block 205 involves receiving first acoustic signals from the acoustic receiver system. In this example, the first acoustic signals correspond to a first instance of the dynamic friction acoustic waves. Here, the first acoustic signals are received by a control system that includes one or more processors.

In some examples, the first acoustic signals may be received directly from the acoustic receiver system in block 205. In other examples the first acoustic signals may be received indirectly from the acoustic receiver system: for example, the first acoustic signals may be received from a memory device, such as a buffer, in block 205. The first acoustic signals may be received by the buffer from the acoustic receiver system and may reside temporarily in the buffer before being received by the control system.

In some implementations, the method 200 may involve subtracting at least a portion of a background image data set from the first acoustic signals. The background image data set may correspond to at least the portion of the acoustic receiver system. Subtracting a corresponding portion of the background image data set from the first acoustic signals can improve the signal-to-noise ratio and can make subsequent processes more accurate and reliable.

In this example, block 207 involves extracting, via the control system, first target object features from the first acoustic signals. The first target object features may, for example, comprise fingerprint features. According to some examples, the fingerprint features may include fingerprint minutiae, keypoints and/or sweat pores. In some examples, the fingerprint features may include ridge ending information, ridge bifurcation information, short ridge information, ridge flow information, island information, spur information, delta information, core information, etc.

According to this implementation, block 209 involves performing, via the control system, a first authentication process based, at least in part, on the first target object features. In some examples, block 209 may involve comparing the first target object features with target object features of an authorized user, such as fingerprint features. The target object features of the authorized user may, for example, have been received during a previous enrollment process.

In some examples, the control system may be configured for controlling access to the apparatus, or to another device, based at least in part on the first authentication process. For example, in some implementations a mobile device (such as a cell phone) may include the apparatus. In some such examples, the control system may be configured for controlling access to the mobile device based, at least in part, on the first authentication process.

In some implementations an Internet of things (IoT) device may include the apparatus 100. For example, in some such implementations a device intended for use in a home, such as a remote control device (such as a remote control device for a smart television), a stove, an oven, a refrigerator, a stove, a coffee maker, an alarm system, a door lock, a mail/parcel box lock, a thermostat, etc., may include the apparatus 100. In some such examples, the control system may be configured for controlling access to the IoT device based, at least in part, on the first authentication process.

In alternative implementations, an automobile (including but not limited to a partially or fully autonomous automobile), a partially or fully autonomous delivery vehicle, a drone, or another device typically used outside of the home may include the apparatus 100. In some such examples, the control system may be configured for controlling access to the vehicle, the drone, etc., based at least in part on the first authentication process.

In some examples, including but not limited to many IoT implementations, there may be a metal, plastic, ceramic or polymer layer between an outer surface of the apparatus 100, or an outer surface of a device that includes the apparatus 100, and the acoustic receiver system 102. In such implementations, the acoustic waves from a finger or other target may need to pass through the metal layer before reaching the acoustic receiver system 102. Ultrasound and other acoustic waves can be successfully transmitted through a metal layer, whereas some other types of waves (e.g., light waves) cannot. Similarly, ultrasound and other acoustic waves can be successfully transmitted through an optically opaque plastic, ceramic or polymer layer, whereas some other types of waves, such as light waves, cannot. This feature is another potential advantage of some disclosed implementations, as compared to devices that rely upon optical or capacitive fingerprint sensors.

In some implementations, the control system may be configured to perform multiple authentication processes (e.g., periodic authentication processes) for controlling access to the apparatus or to another device. According to some such implementations, the control system may be configured for receiving second through Nth acoustic signals from the acoustic receiver system. The second through Nth acoustic signals may corresponding to second through Nth instances of the dynamic friction acoustic waves. The control system may be configured for extracting second through Nth target object features from each of the second through Nth acoustic signals and for performing second through Nth authentication processes based, at least in part, on the first target object features. The control system may be configured for controlling access to the apparatus, or to the other device, based at least in part on the second through Nth authentication processes.

As noted elsewhere herein, in some examples the apparatus may not include a transmitter (e.g., an ultrasonic transmitter or an optical transmitter) corresponding to the acoustic receiver. However, even in some implementations in which the apparatus does include a transmitter corresponding to the acoustic receiver, it may not be necessary to use the transmitter in order to extract satisfactory target object features from the acoustic signals. In examples wherein the acoustic waves received by the acoustic receiver are produced by dynamic friction between the target object and an outer surface of the apparatus, there may be no need to control the transmitter to insonify the target object.

However, some implementations may provide functionality other than, or in addition to, authentication-related functionality. For example, some implementations in which the apparatus does not include a transmitter (e.g., an ultrasonic transmitter or an optical transmitter) corresponding to the acoustic receiver may be configured for force and/or pressure detection. In some such examples, piezoelectric material in the acoustic receiver may respond to applied force. An area of the acoustic receiver in which the applied force is being detected may be determined. A pressure may be estimated by dividing the applied force by the area. Some no-transmitter implementations may be configured to detect a direction of motion of one or more target objects that is or are applying force to the acoustic receiver. Some such implementations may be configured to control a cursor, an arrow, etc., displayed on a display screen that is in communication with the acoustic receiver, based in part on the determined force(s) and/or direction of motion of one or more target objects. In some no-transmitter implementations, a "zoom in" or "zoom out" display control may be based on the determined force(s) and/or direction of motion of one or more target objects as determined via the acoustic receiver.

Figure 3A:
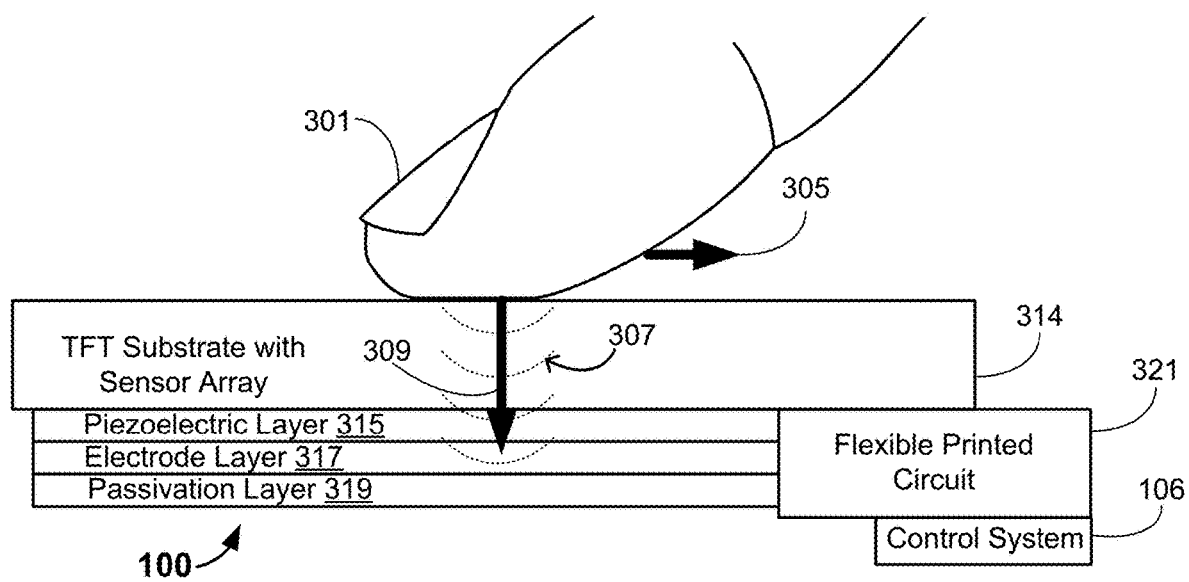
FIG. 3A provides an example of an apparatus configured to perform at least some methods disclosed herein.
Figure 3B:
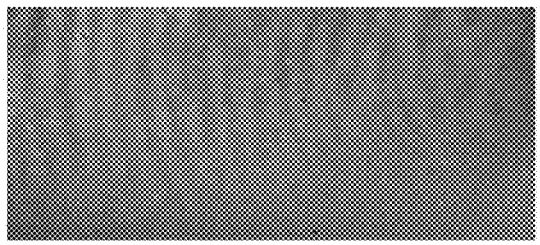
FIG. 3B is a grayscale image corresponding to acoustic signals received by an acoustic receiver system of the type of device illustrated in FIG. 3A.
Figure 3C:
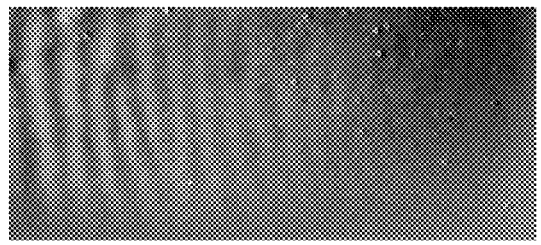
FIG. 3C is another grayscale image corresponding to acoustic signals received by an acoustic receiver system of the type of device illustrated in FIG. 3A.
Figure 3D:
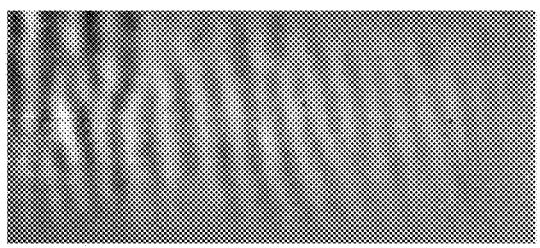
FIG. 3D is another grayscale image corresponding to acoustic signals received by an acoustic receiver system of the type of device illustrated in FIG. 3A.
Figure 3E:
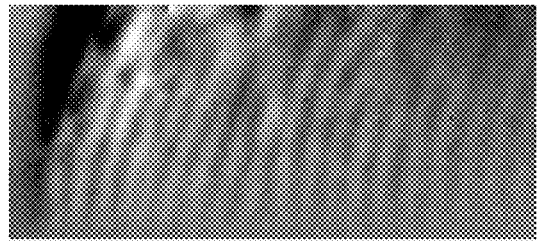
FIG. 3E is another grayscale image corresponding to acoustic signals received by an acoustic receiver system of the type of device illustrated in FIG. 3A.

FIG. 3A provides an example of an apparatus configured to perform at least some methods disclosed herein. The apparatus 100 may, for example, be configured to perform the method 200 that is described above with reference to FIG. 2. As with other disclosed implementations, the numbers, types and arrangements of elements shown in FIG. 3A are merely presented by way of example. In the example shown in FIG. 3A, a target object 301 (which is an actual finger in this example) is in contact with an outer surface of the apparatus 100. In this example, the target object 301 is moving in the direction indicated by the arrow 305. According to this example, the outer surface of the apparatus 100 is the outer surface of a thin-film transistor (TFT) substrate 314 that includes a piezoelectric receiver array, which is an ultrasonic receiver array in this instance. Here, acoustic waves 307 generated by the dynamic friction between the target object 301 and the outer surface propagate in the direction of the arrow 309, as well as in other directions.

In the example shown in FIG. 3A, a piezoelectric layer 315 is coupled to the TFT substrate 314. The piezoelectric layer 315 may include one or more ferroelectric polymers such as polyvinylidene fluoride (PVDF) or polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Alternatively, or additionally, the piezoelectric layer 315 may include one or more other piezoelectric materials such as polyvinylidene chloride (PVDC) homopolymers or copolymers, polytetrafluoroethylene (PTFE) homopolymers or copolymers, diisopropylammonium bromide (DIPAB), aluminum nitride (AlN) and/or lead zirconate titanate (PZT).

According to this example, the apparatus 100 includes an electrode layer 317 adjacent to the piezoelectric layer 315 and a passivation layer 319 adjacent to the electrode layer 317. In this instance, at least a portion of the control system 106 is configured for electrical communication with the electrode layer 317, the piezoelectric layer 315 and the TFT substrate 314 via a flexible printed circuit 321. The control system 106 may be configured to perform, at least in part, the methods disclosed herein. In some examples, the control system 106 may be configured to perform the methods that are described above with reference to FIG. 2.

FIGS. 3B-3E are grayscale images corresponding to acoustic signals received by an acoustic receiver system of the type of device illustrated in FIG. 3A. In these examples, the acoustic signals were dynamic friction acoustic waves produced by a finger being swiped across the outer surface of the TFT substrate 314 in the direction 305 shown in FIG. 3A. In these examples, the TFT substrate 314 was a glass substrate that had a thickness of 215 microns.

FIG. 3F shows a target object swiping the bottom surface of the same type of apparatus that is shown in FIG. 3A. FIGS. 3G-3F are grayscale images corresponding to acoustic signals received by the device illustrated in FIG. 3F. In these examples, the acoustic signals were dynamic friction acoustic waves produced by a finger being swiped across the outer surface of the passivation layer 319 in the direction 305.

Figure 3K:
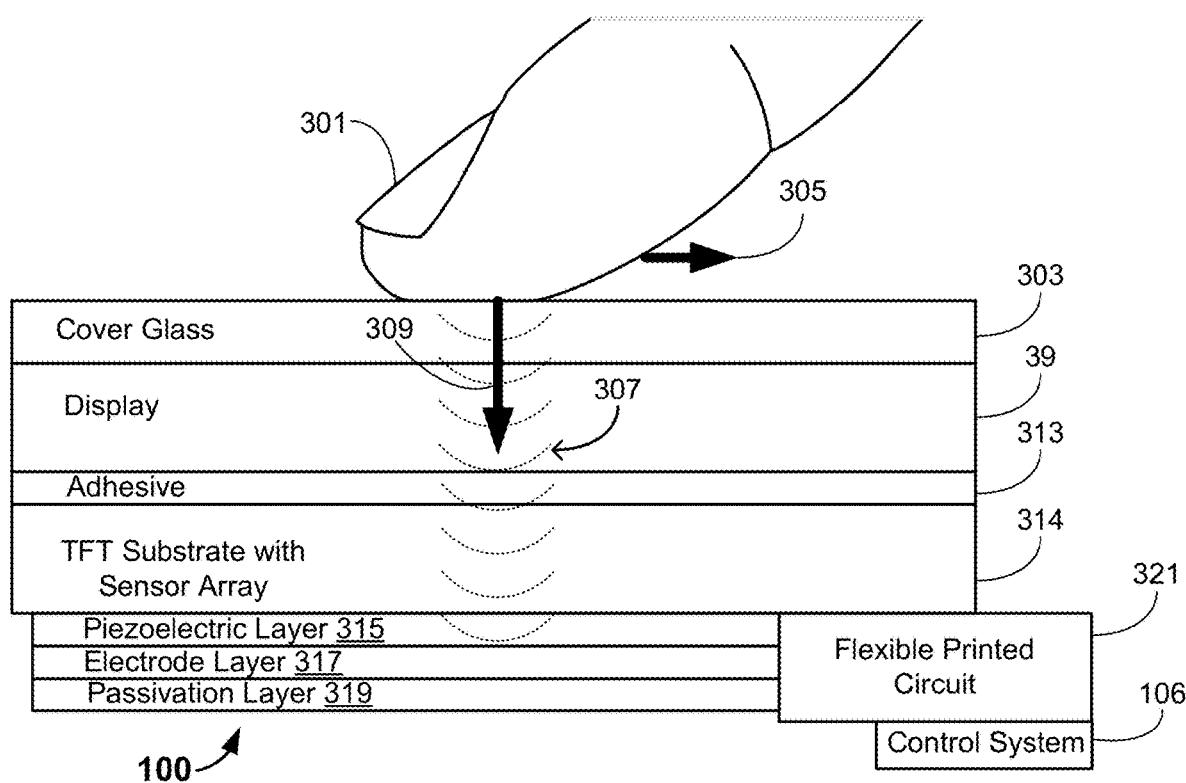
FIG. 3K shows a target object swiping the outer surface of an apparatus that is similar to that shown in FIG. 3A.

FIG. 3K shows a target object swiping the outer surface of an apparatus that is similar to that shown in FIG. 3A. However, in the example shown in FIG. 3A, the target object 301 is swiping the outer surface of a cover glass 303. According to this example, a display 311 underlies the cover class 303. The display 311 may, for example, correspond with the optional display 101 of FIG. 1. In some examples the display 311 may be, or may include, a light-emitting diode (LED) display, such as an organic light-emitting diode (OLED) display.

Here, the apparatus 100 resides below a portion of the display 311, not all of which is shown in FIG. 3K. In alternative examples, the apparatus 100 may reside below a larger portion of the display 311, or below the entire visible extent of the display 311. According to this example, an adhesive layer 313 couples the TFT substrate 314 to the display 311.

Figure 4:
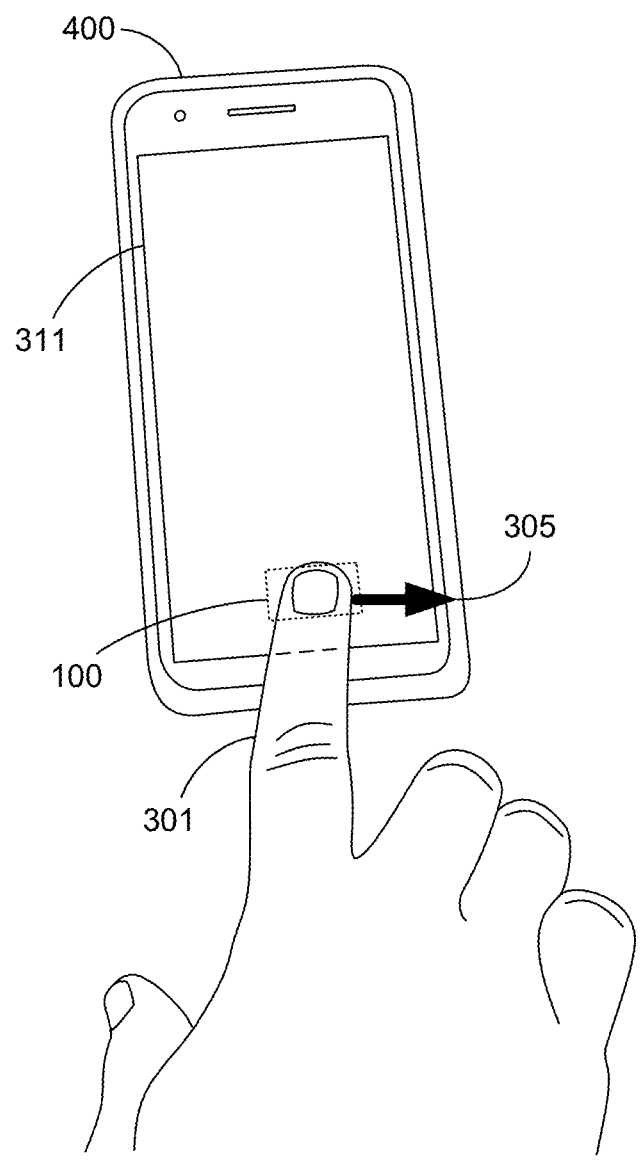
FIG. 4 shows an example of a display device that includes the apparatus shown in FIG. 1.

FIG. 4 shows an example of a display device that includes the apparatus shown in FIG. 1. In this example, the display device 400 is a cellular telephone that includes the apparatus 100. Here, the apparatus 100 is disposed below a portion of the display 311. In alternative examples, the apparatus 100 may be disposed below a larger portion of the display 311, or below the entire visible extent of the display 311. In other examples, the apparatus 100 may reside in or on a user input device of the display device 400, such as a button. In some implementations, the apparatus 100 may be configured to perform fingerprint sensor functionality, such as fingerprint authentication functionality. According to this example, the target object 301 is a finger. In some such implementations, the apparatus 100 is configured to perform the methods disclosed herein.

Figure 5:
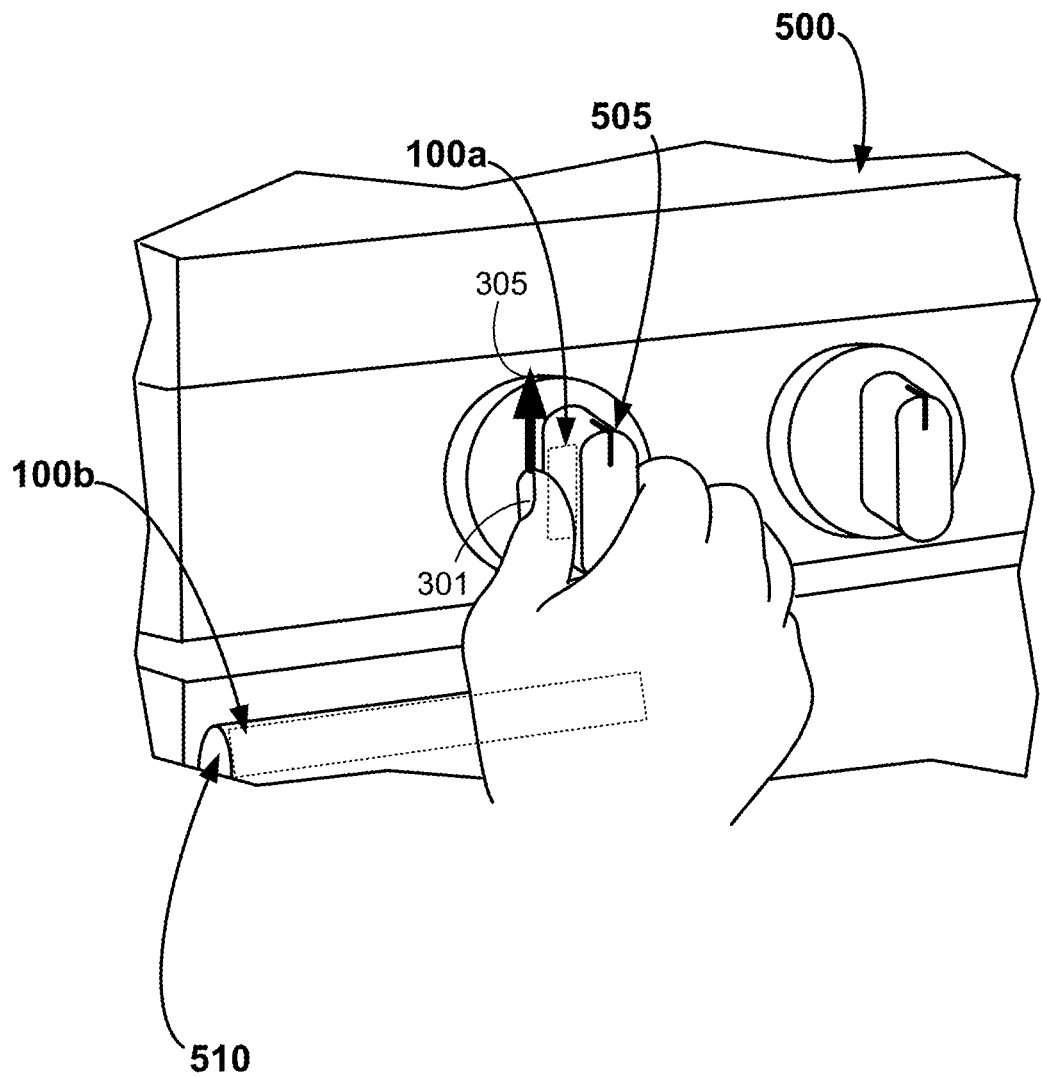
FIG. 5 shows an example of a stove that includes instances of the apparatus shown in FIG. 1.

FIG. 5 shows an example of a stove that includes instances of the apparatus shown in FIG. 1. In this example, the apparatus 100a resides in at least a portion of the perimeter of the stove knob 505. According to this example, the target object 301 is a thumb. (As used herein, a "thumb" may be regarded as an instance of a "finger" and a thumbprint may be regarded as an instance of a fingerprint.) In some such implementations, the apparatus 100 is configured to perform at least some of the methods disclosed herein. Other stove knobs may also include instances of the apparatus 100, depending on the particular implementation. According to this example, the apparatus 100b resides in at least a portion of the oven handle 510. The apparatus 100a and the apparatus 100b may, in some examples, be configured for communication with a control system for the stove 500. In some implementations, the control system may be configured to control access to a stovetop heating element depending on whether fingerprint data based on fingerprints obtained by the apparatus 100a match stored fingerprint data of an authorized user. Similarly, the control system may be configured to control access to an oven depending on whether fingerprint data based on fingerprints obtained by the apparatus 100b match stored fingerprint data of an authorized user. Such access determinations may, for example, prevent children from using the stovetop heating elements and/or the oven.

Figure 6:
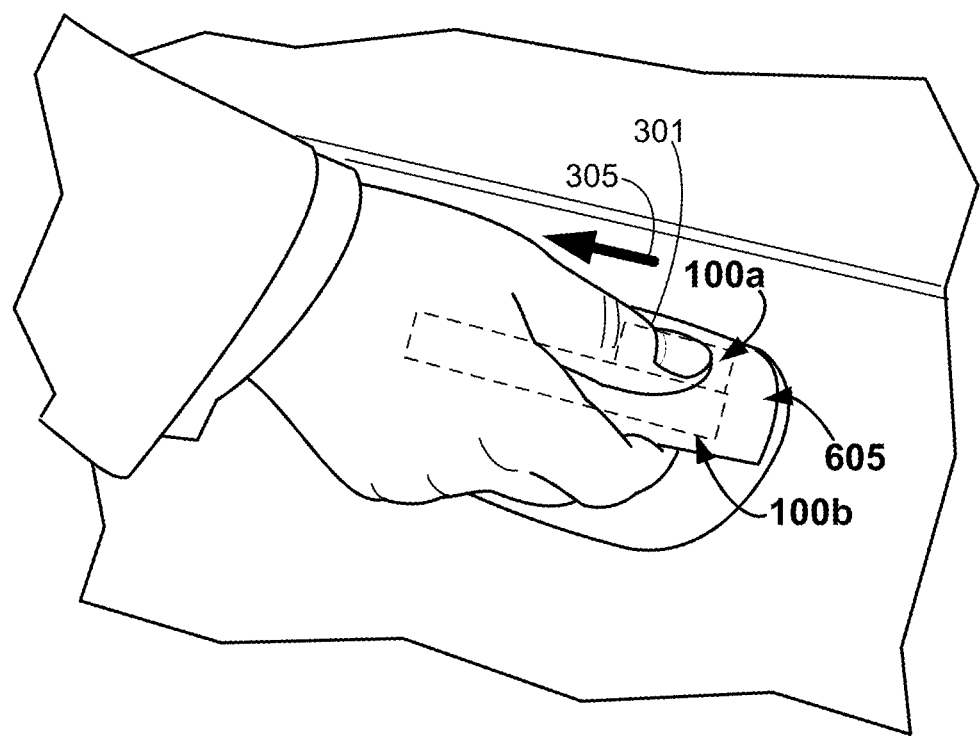
FIG. 6 shows an example of an automobile door handle that includes instances of the apparatus shown in FIG. 1.

FIG. 6 shows an example of an automobile door handle that includes instances of the apparatus shown in FIG. 1. In this example, the apparatus 100a resides in at least a portion of an outer surface of the automobile door handle 605 and the apparatus 100b resides in at least a portion of an inner surface of the automobile door handle 605. According to this example, the target object 301 for the apparatus 100a is a thumb. In some such implementations, the apparatus 100 is configured to perform at least some of the methods disclosed herein. Other automobile door handles may also include instances of the apparatus 100, depending on the particular implementation. The apparatus 100a and the apparatus 100b may, in some examples, be configured for communication with a control system for the automobile. In some implementations, the control system may be configured to control access to the automobile depending on whether fingerprint data based on fingerprints obtained by the apparatus 100a and/or the apparatus 100b match stored fingerprint data of an authorized user.

Figure 7:
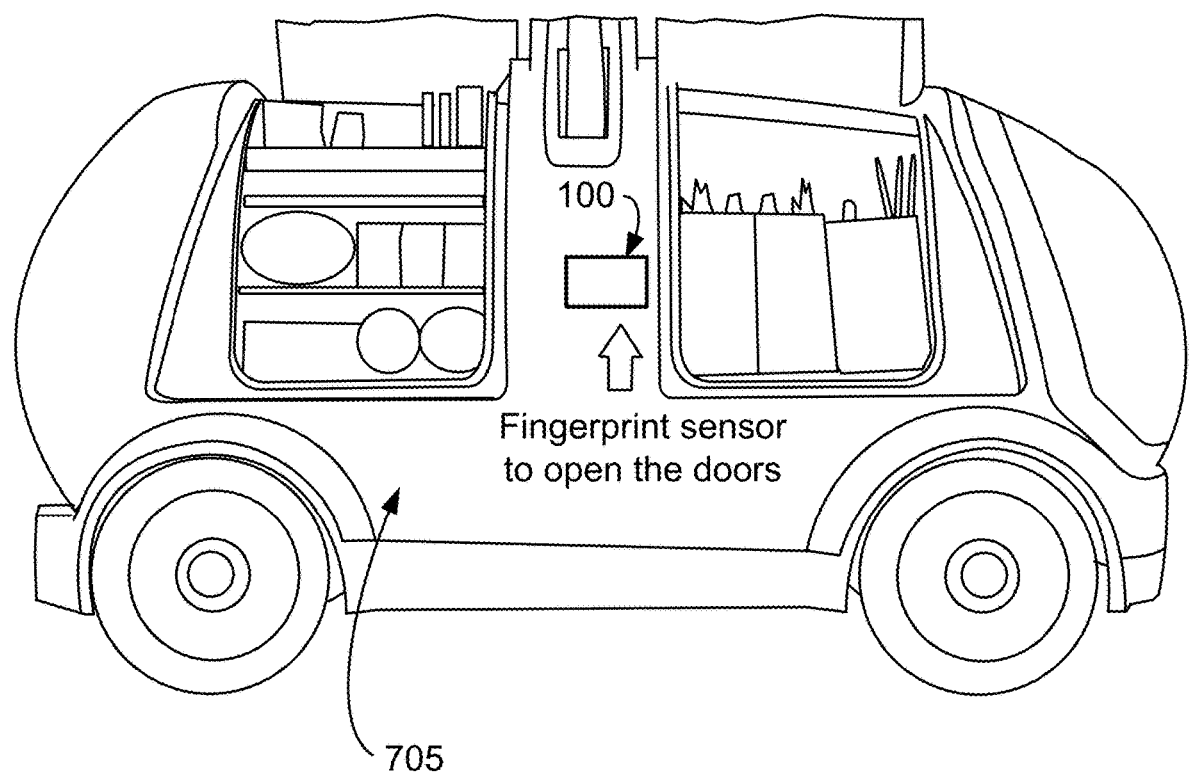
FIG. 7 shows an example of an autonomous delivery vehicle that includes at least one instance of the apparatus shown in FIG. 1.

FIG. 7 shows an example of an autonomous delivery vehicle that includes at least one instance of the apparatus shown in FIG. 1. In this example, the apparatus 100 resides in a portion of an outer surface of the autonomous delivery vehicle 705. In some examples, the apparatus 100 may resides in at least a portion of a touch pad or a similar control device that is located on an outer surface of the autonomous delivery vehicle 705. The autonomous delivery vehicle 705 may or may not include other instances of the apparatus 100, depending on the particular implementation. The apparatus 100 may, in some examples, be configured for communication with a control system for the autonomous delivery vehicle 705. In some implementations, the control system may be configured to control access to the autonomous delivery vehicle 705 depending on whether fingerprint data based on fingerprints obtained by the apparatus 100 match stored fingerprint data of an authorized user.

FIGS. 8A-8F show cross-sectional schematic views of various example ultrasonic sensor systems in a "receiver down" orientation according to some implementations. In the "receiver down" orientation, a piezoelectric transceiver layer is underlying a sensor substrate so that the sensor substrate is in the acoustic path. An FPC may be coupled to the sensor substrate so that the FPC is underlying the sensor substrate in the "receiver down" orientation.

In FIGS. 8A-8F, each of the ultrasonic fingerprint sensor systems 800 includes a sensor substrate 830, a piezoelectric transceiver layer 840, a transceiver electrode layer 845, a passivation layer 850 (except in FIG. 8F), and an FPC 820 coupled to the sensor substrate 830. The piezoelectric transceiver layer 840 may include a piezoelectric material configured to transmit ultrasonic waves upon the application of a voltage. Examples of a suitable piezoelectric material include PVDF or PVDF-TrFE copolymers. In some implementations, the piezoelectric material is configured to receive ultrasonic waves and generate a surface charge that is provided to sensor pixel circuits disposed in or on the sensor substrate 830. The sensor substrate 830 may include a plurality of sensor pixel circuits 835 such as a TFT array of sensor pixel circuits. The sensor pixel circuits 835 on the sensor substrate 830 may amplify or buffer the generated surface charge to provide electrical output signals to the FPC 820 or control system (not shown). The ultrasonic fingerprint sensor system 800 in the "receiver down" orientation includes a transceiver electrode layer 845 underlying the piezoelectric transceiver layer 840 and coupled to the piezoelectric transceiver layer 840. In some implementations, the transceiver electrode layer 845 may include a metallized electrode that may be grounded or biased to control which signals may be generated and which reflected signals may be passed to the plurality of sensor pixel circuits 835 disposed on the sensor substrate 830. The ultrasonic fingerprint sensor system 800 in the "receiver down" orientation may include a passivation layer 850 underlying the transceiver electrode layer 845 or at least portions of the transceiver electrode layer 845. The passivation layer 850 may include one or more layers of electrically insulating material, such as silicon nitride, silicon dioxide, benzocyclobutene (BCB), polyimide, a thermosetting material such as a thermosetting epoxy, a UV-curable resin, an acrylic, an epoxy, or other suitable material to provide protection for underlying electrodes, the piezoelectric transceiver layer 840, interconnects, electrical traces, electrical and electronic components, and electronic circuits. The thickness of the passivation layer 850 may be selected to maximize the efficiency of the ultrasonic fingerprint sensor system 800. In some implementations, the passivation layer 850 may be printed, sprayed or laminated onto an outer portion of the transceiver electrode layer 845.

In each of the ultrasonic fingerprint sensor systems in FIGS. 8A-8F, a mechanical stress isolation layer 810 may be disposed over the sensor substrate 830 in the "receiver down" orientation.

In each of the ultrasonic fingerprint sensor systems 800 in FIGS. 8A-8D, the mechanical stress isolation layer 810 is positioned between two adhesive layers 805, 825. In some implementations, a first adhesive layer 805 positioned between the mechanical stress isolation layer 810 and a display (not shown) may include a pressure-sensitive adhesive. In some implementations, a second adhesive layer 825 between the mechanical stress isolation layer 810 and the sensor substrate 830 may include a structural adhesive, such as a thermally curable epoxy. An edge seal 815 may be provided on the mechanical stress isolation layer 810 and around the sides of the ultrasonic fingerprint sensor system 800 and in some implementations on the back side to seal and protect the ultrasonic fingerprint sensor system 800 as a package. The edge seal 815 may serve to protect the ultrasonic fingerprint sensor system 800 against the ambient environment, moisture ingress and external forces. In some implementations, the edge seal 815 may include a thermally curable epoxy. The mechanical stress isolation layer 810 enables the edge seal 815 so that the edge seal 815 is not directly attached or bonded to the display, which could otherwise result in stresses and distortions being imparted to the display.

Figure 8A:
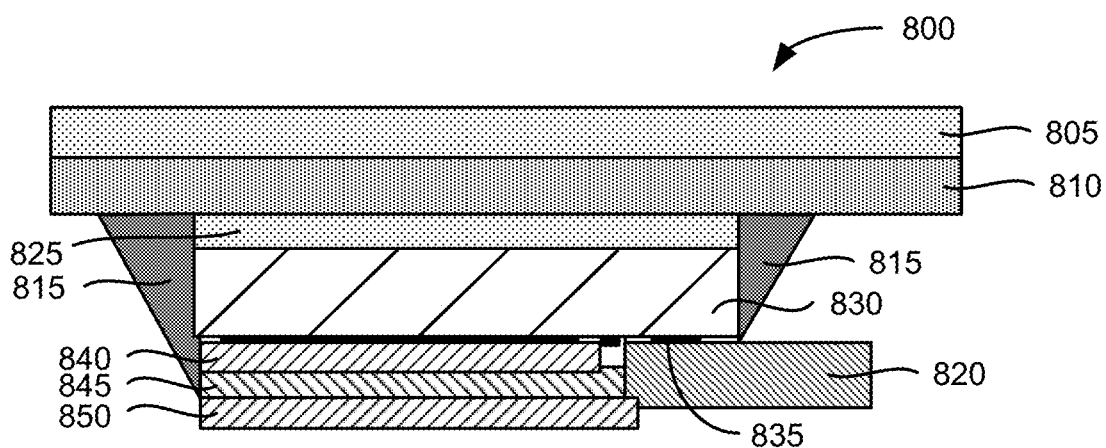
FIG. 8A shows a cross-sectional schematic view of an example ultrasonic sensor systems in a "receiver down" orientation.

FIG. 8A as shown does not include additional backing layers or structures underlying the passivation layer 850 of the ultrasonic fingerprint sensor system 800. In this configuration, air serves as an effective backing layer. However, air backing layers may provide insufficient protection against inadvertent contact with other components, which may result in interference with the ultrasonic imaging and potential mechanical damage to the sensor system 800. In FIG.

8B, the ultrasonic fingerprint sensor system further includes a foam backing layer 855 (also referred to as a "foam backer" or "foam layer") and a stiffener 860 underlying the foam backing layer 855 relative to the ultrasonic fingerprint sensor system 800 of FIG. 8A. In some implementations, the ultrasonic fingerprint sensor system 800 includes a stiffener 860 and an electrical shield underlying the foam backing layer 855. The stiffener 860, which may be a stamped layer of stainless steel or aluminum in some implementations, may be electrically grounded to provide an effective electrical shield.

The foam backing layer 855 may have an acoustic impedance very close to air and substantially lower than the piezoelectric transceiver layer 840 such that acoustic wave transmission into the foam backing layer 855 and subsequent layers is significantly reduced. The foam backing layer 855 may have an acoustic impedance substantially different than the piezoelectric transceiver layer 840. The acoustic impedance mismatch between the foam backing layer 855 and the piezoelectric transceiver layer 840 are substantially different. The term "substantially different" with respect to acoustic impedance throughout this disclosure refers to an acoustic impedance value that is at least five times, at least eight times, at least ten times, or at least 100 times greater or less than an acoustic impedance value being compared to. That way, the foam backing layer 855 can provide total or near-total reflection of propagating ultrasonic waves. In addition, the foam backing layer 855 may provide a mechanical support and cushion for protecting the ultrasonic fingerprint sensor system 800. When external forces are applied to the ultrasonic fingerprint sensor system 800 from other components or objects touching the back side of the sensor, acoustic energy may be lost unless a foam backing layer or other protection (e.g., a sensor housing and an air cavity) is provided. Details regarding the foam backing layer 855 are discussed further with respect to FIGS. 13A-13B.

Figure 8B:
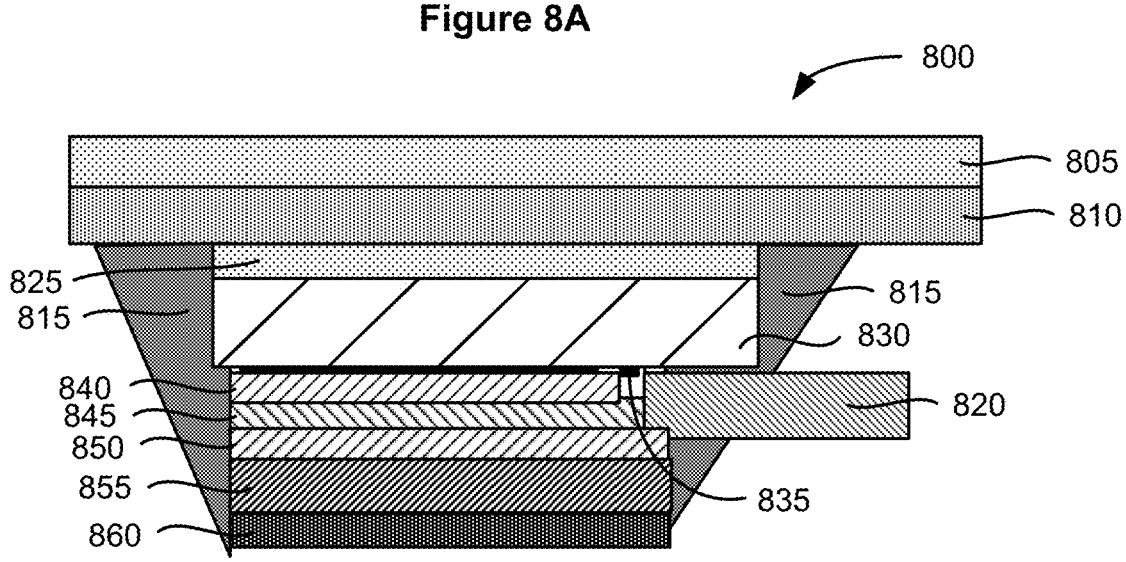
FIG. 8B shows a cross-sectional schematic view of another example ultrasonic sensor system in a "receiver down" orientation.

In FIG. 8B, the stiffener 860 may serve as a cap and may be coupled to the back side of the ultrasonic fingerprint sensor system 800. In some implementations, the stiffener 800 may comprise a wafer, substrate, panel, sub-panel, or one or more layers of plastic, metal, glass, or silicon. In some implementations, the stiffener 860 may have a high flexural modulus and mechanical strength to structurally and environmentally protect the ultrasonic fingerprint sensing system 800. The foam backing layer 855 and the stiffener 860 may combine to provide the ability to seal the sensor system 800 from external moisture and to improve moisture protection for higher reliability. In some implementations, an air backing layer may be combined with the foam backing layer 855 and positioned between the transceiver electrode layer 845 and the stiffener 860 to provide additional acoustic isolation.

Figure 8C:
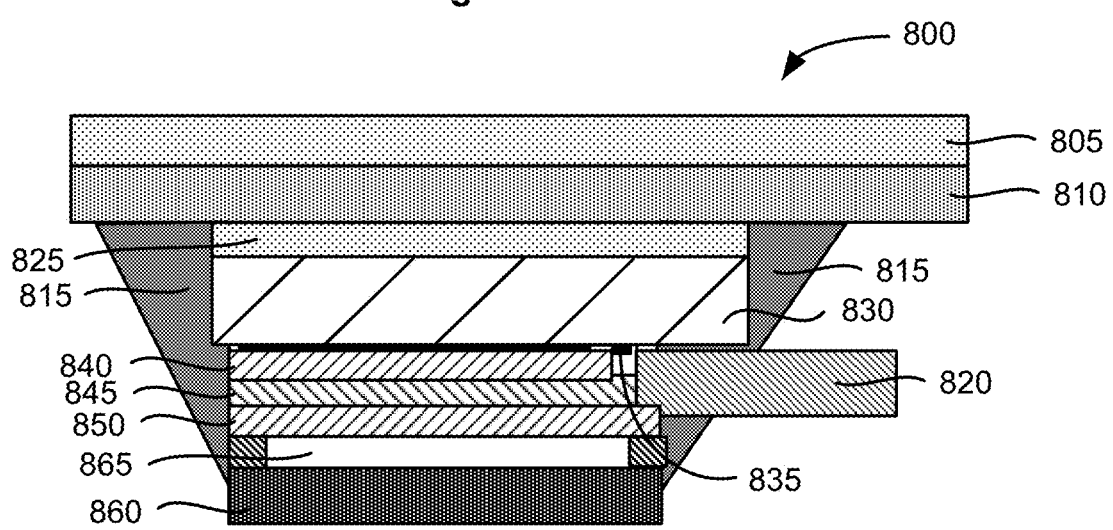
FIG. 8C shows a cross-sectional schematic view of another example ultrasonic sensor system in a "receiver down" orientation.

In FIG. 8C, the ultrasonic fingerprint sensor system 800 further includes a stiffener 860 and a cavity 865 relative to the ultrasonic fingerprint sensor system 800 of FIG. 8A. The cavity 865 may be an air gap defined between the stiffener 860 and the passivation layer 850 of the ultrasonic fingerprint sensor system 800. One or more spacers may be used to control the gap height or height of the cavity 865. The cavity 865 forms an air backing layer that may provide a substantial acoustic impedance mismatch with the piezoelectric transceiver layer 840, transceiver electrode layer 845, and passivation layer 850 so that the cavity 865 can provide total or near-total reflection of propagating ultrasonic waves. An electrical shield may be further provided on the back side of the ultrasonic fingerprint sensor system 800 along with the stiffener 860. In some implementations, the stiffener 860 may be electrically grounded and serve as an electrical shield.

Figure 8D:
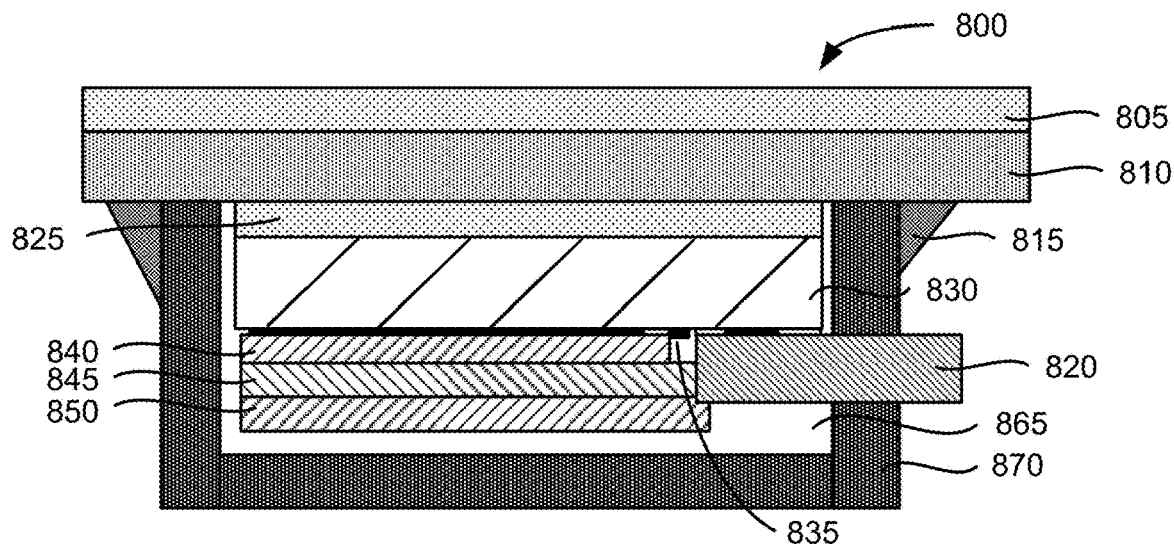
FIG. 8D shows a cross-sectional schematic view of another example ultrasonic sensor system in a "receiver down" orientation.

In FIG. 8D, the ultrasonic fingerprint sensor system 800 further includes a sensor housing 870 and a cavity 865 relative to the ultrasonic fingerprint sensor system 800 of FIG. 8A. The cavity 865 forms an air gap or air backing layer (also referred to as an "air backer") between the sensor housing 870 and at least the passivation layer 850 of the ultrasonic fingerprint sensor system 800. In some implementations, the sensor housing 870 includes one or more layers of plastic or metal. The sensor housing 870 may be disposed on the mechanical stress isolation layer 810 to provide encapsulation of the ultrasonic fingerprint sensor system 800. An electrical shield may be provided on the back side of the ultrasonic fingerprint sensor system 800 along with the sensor housing 870. As described with respect to FIG. 8C, a stiffener may be electrically grounded and serve as an electrical shield. The stiffener may be included as part of the sensor housing 870 or on the sensor housing 870.

Figure 8E:
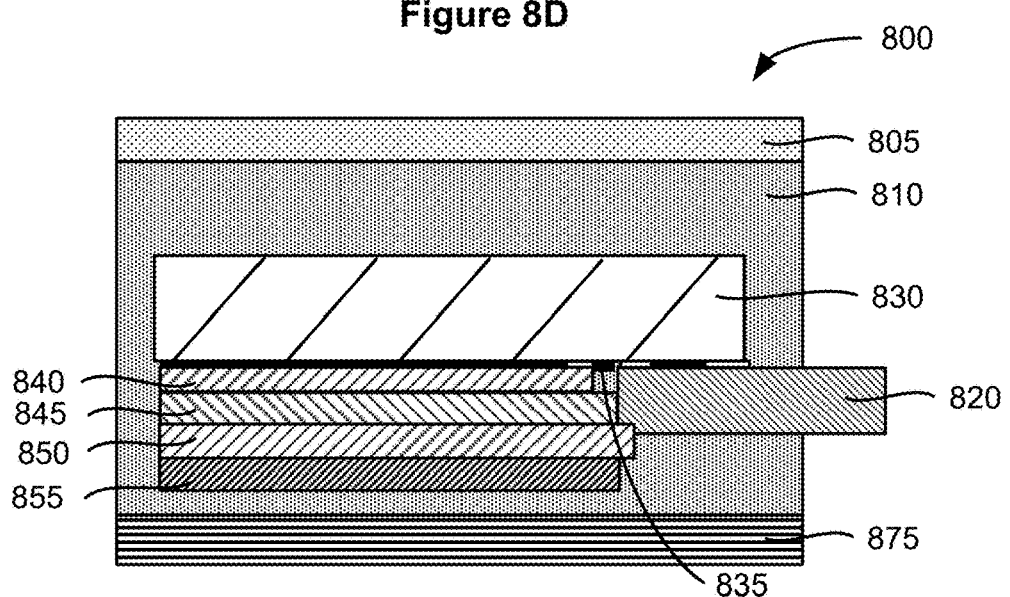
FIG. 8E shows a cross-sectional schematic view of another example ultrasonic sensor system in a "receiver down" orientation.
Figure 8F:
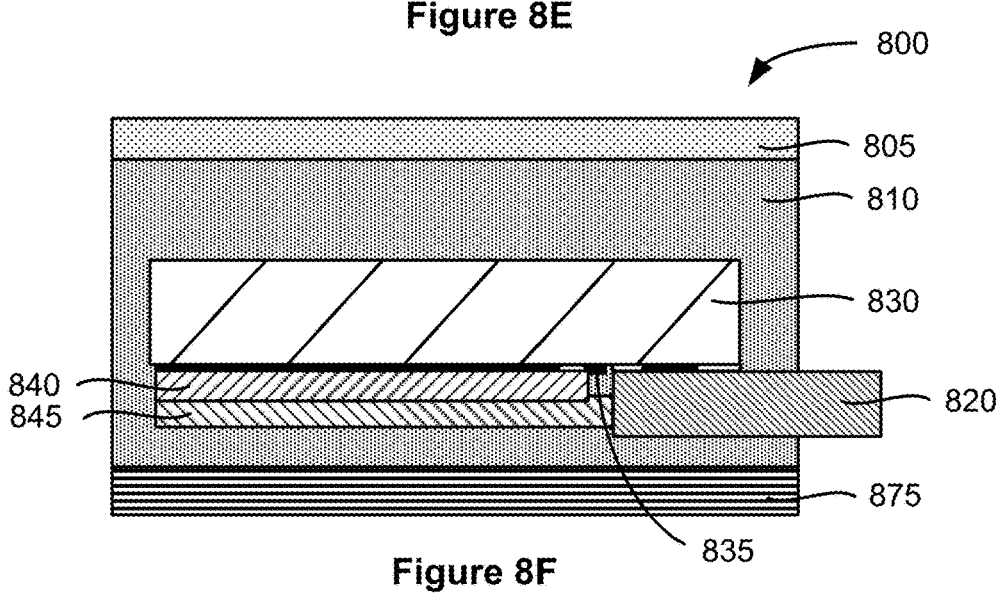
FIG. 8F shows a cross-sectional schematic view of another example ultrasonic sensor system in a "receiver down" orientation.

In the ultrasonic fingerprint sensor systems 800 shown in FIGS. 8E-8F, the mechanical stress isolation layer 810 may be formed as a molded structure around the ultrasonic fingerprint sensor system 800. Instead of an adhesive layer positioned between the mechanical stress isolation layer 810 and the sensor substrate 830 and instead of an edge seal around the ultrasonic fingerprint sensor system 800 in the "receiver down" orientation, the mechanical stress isolation layer 810 may be molded to surround the ultrasonic fingerprint sensor system 800 as a package. Thus, the mechanical stress isolation layer 810 is formed on the front side, edges, and back side of the ultrasonic fingerprint sensor system 800. In some implementations, a cavity may be formed in the molded mechanical stress isolation layer 810 behind the sensor active area to serve as an air backing layer for improved acoustic isolation.

In FIG. 8E, the ultrasonic fingerprint sensor system 800 includes a foam backing layer 855 underlying the passivation layer 850. The foam backing layer 855 may serve one or both of a mechanical function (e.g., cushion) and acoustic function (e.g., reflection of ultrasonic waves). An electrical shield 875 may be disposed on the back side of the ultrasonic fingerprint sensor system 800, where the mechanical stress isolation layer 810 on the back side is positioned between the electrical shield 875 and the foam backing layer 855. In some implementations, an air backing layer may be combined with the foam backing layer 855 and both positioned between the transceiver electrode layer 845 and the backside portion of the molded mechanical stress isolation layer 810 to provide additional acoustic isolation.

In FIG. 8F, the ultrasonic fingerprint sensor system 800 includes an electrical shield 875 underlying the mechanical stress isolation layer 810 on the back side. However, in contrast to FIG. 8E, the ultrasonic fingerprint sensor system 800 does not include a foam backing layer or a passivation layer. In some implementations, an air backing layer may be formed in the molded mechanical stress isolation layer 810 behind the sensor active area.

FIGS. 9A-9F show cross-sectional schematic views of various example ultrasonic sensor systems in a "receiver up" orientation according to some implementations. In the "receiver up" orientation, a piezoelectric transceiver layer is overlying a sensor substrate so that the sensor substrate is not in the acoustic path. Rather, a transceiver electrode layer and a passivation layer are in the acoustic path. An FPC may be coupled to the sensor substrate so that the FPC is overlying the sensor substrate in the "receiver up" orientation.

Figure 9A:
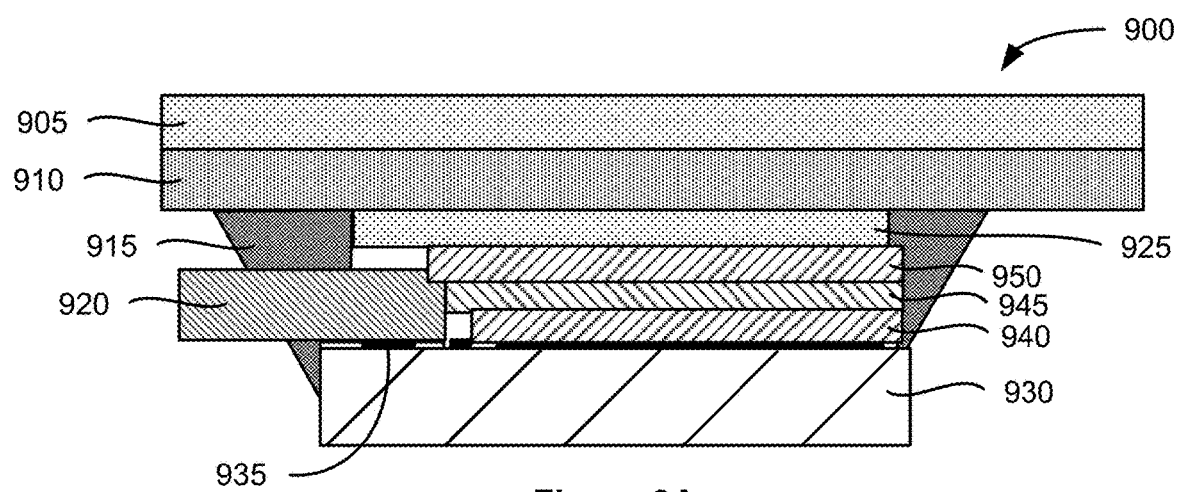
FIG. 9A shows a cross-sectional schematic view of an example ultrasonic sensor system in a "receiver up" orientation.
Figure 9B:
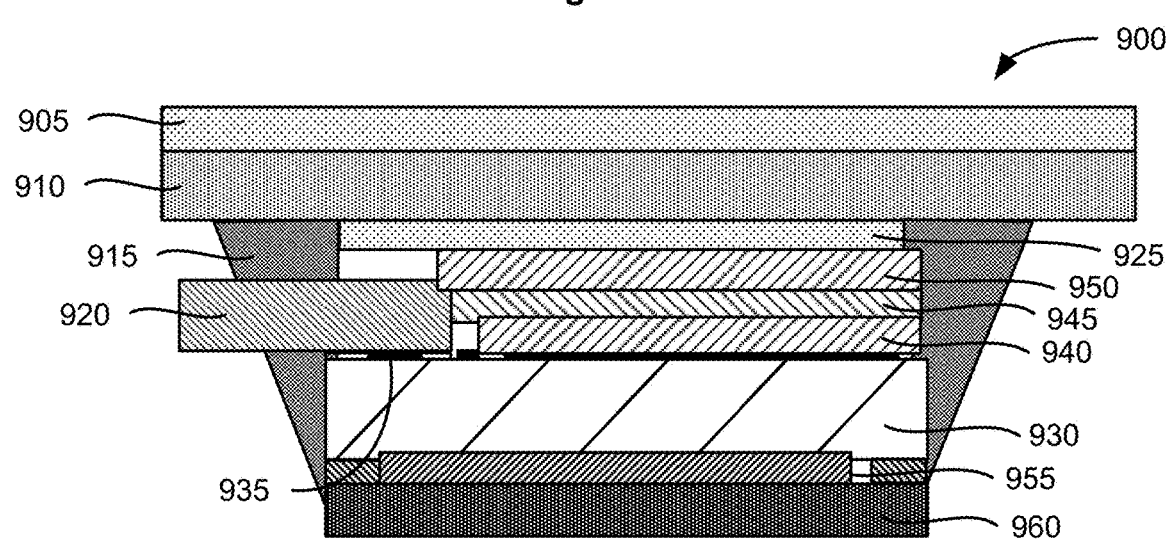
FIG. 9B shows a cross-sectional schematic view of another example ultrasonic sensor system in a "receiver up" orientation.
Figure 9C:
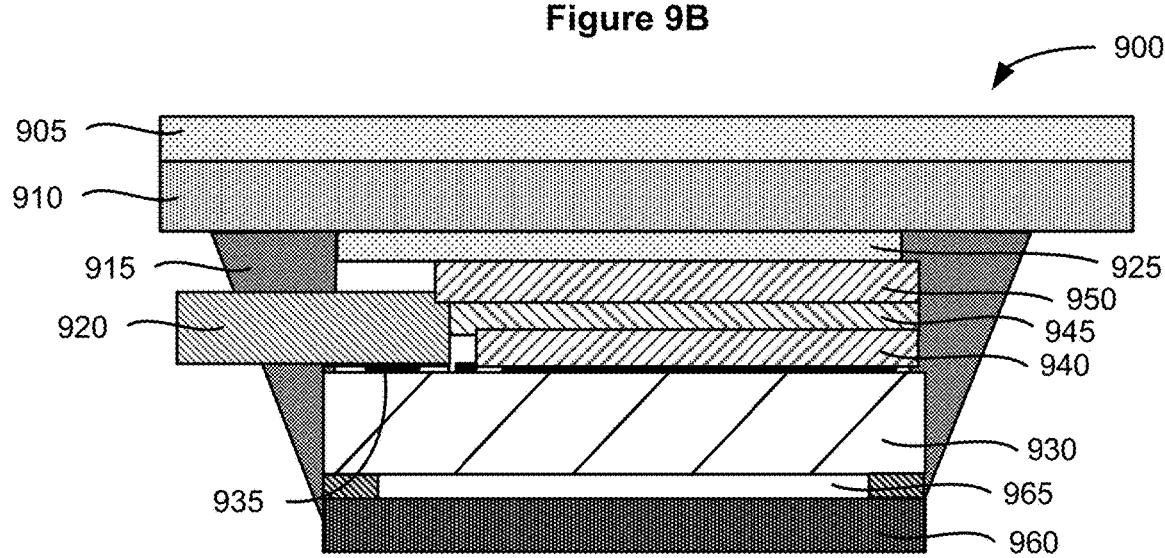
FIG. 9C shows a cross-sectional schematic view of another example ultrasonic sensor system in a "receiver up" orientation.
Figure 9D:
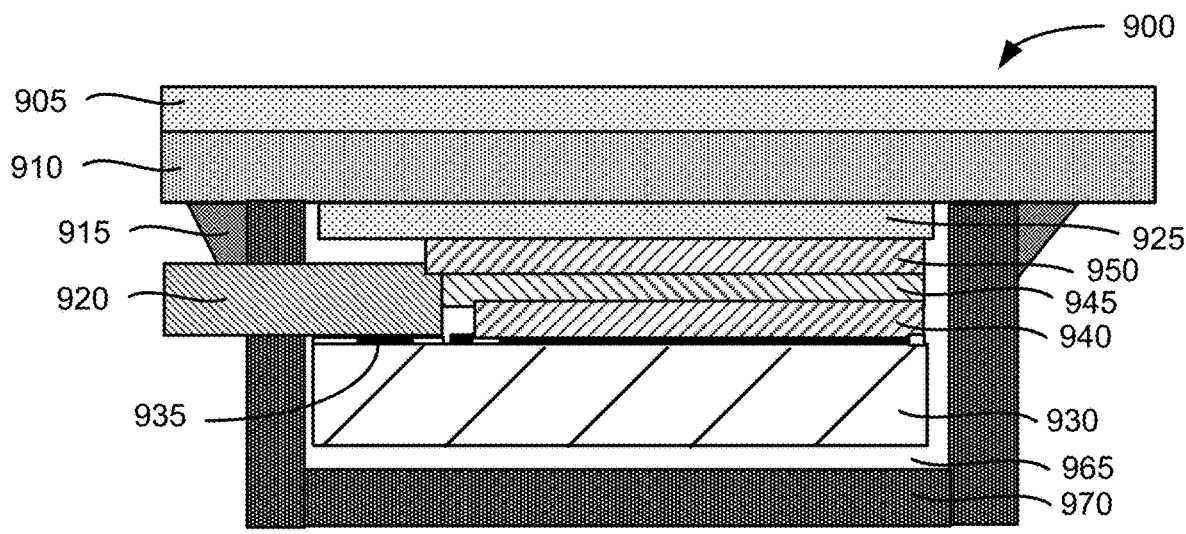
FIG. 9D shows a cross-sectional schematic view of another example ultrasonic sensor system in a "receiver up" orientation.
Figure 9E:
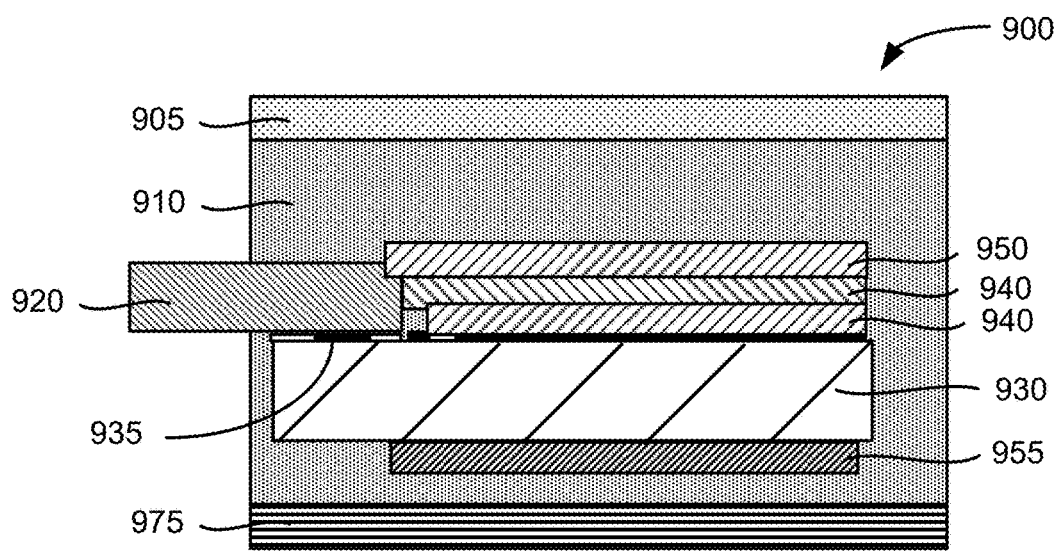
FIG. 9E shows a cross-sectional schematic view of another example ultrasonic sensor system in a "receiver up" orientation.
Figure 9F:
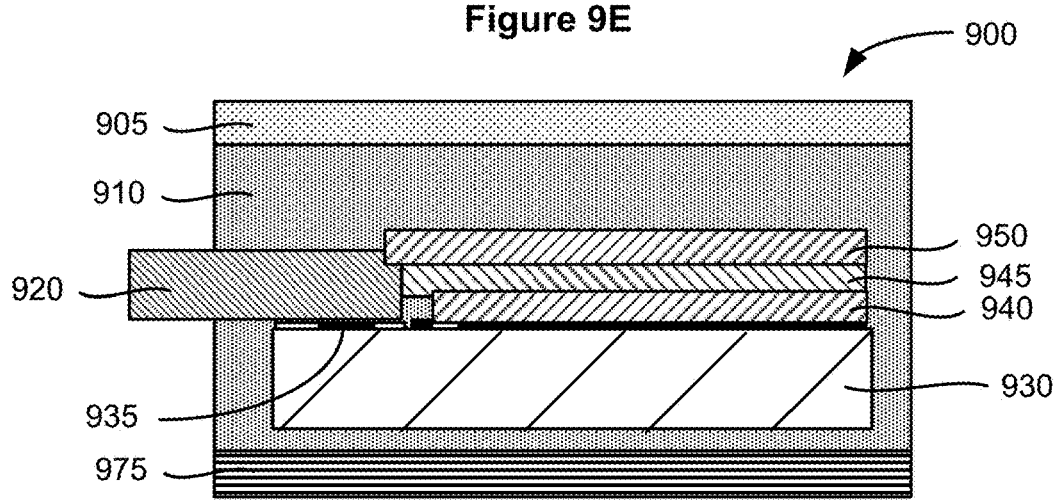
FIG. 9F shows a cross-sectional schematic view of another example ultrasonic sensor system in a "receiver up" orientation.

In FIGS. 9A-9F, each of the ultrasonic fingerprint sensor systems 900 includes a sensor substrate 930, a piezoelectric transceiver layer 940, a transceiver electrode layer 945, a passivation layer 950, and an FPC 920 coupled to the sensor substrate 930 similar to that shown in FIGS. 9A-9F. Similar to the configurations shown in FIGS. 9A-9D, a mechanical stress isolation layer 910 may be positioned between at least two adhesive layers 905, 925 as shown in FIGS. 9A-9D. Similar to the configurations shown in FIGS. 9E-9F, a mechanical stress isolation layer 910 may be molded around the ultrasonic fingerprint sensor system 900 as shown in FIGS. 9E-9F.

The ultrasonic fingerprint sensor system 900 in the "receiver up" orientation includes the piezoelectric transceiver layer 940 coupled to and overlying the sensor substrate 930 with a plurality of sensor pixel circuits 935 disposed thereon. The transceiver electrode layer 945 may be coupled to and overlying the piezoelectric transceiver layer 940, and the passivation layer 950 may be overlying the transceiver electrode layer 945 or at least portions of the transceiver electrode layer 945. In FIG. 9B, a foam backing layer 955 along with one or both of a stiffener 960 and an electrical shield underlies the sensor substrate 930 at the back side of the ultrasonic fingerprint sensor system 900. In FIG. 9C, a cavity 965 and one or both of a stiffener 960 and an electrical shield underlies the sensor substrate 930 at the back side of the ultrasonic fingerprint sensor system 900. In FIG. 9D, a cavity 965 and one or both of a housing 970 and an electrical shield underlies the sensor substrate 930 at the back side of the ultrasonic fingerprint sensor system 900. In FIG. 9E, the mechanical stress isolation layer 910 may be molded around the ultrasonic fingerprint sensor system 900, where a foam backing layer 955 underlies the sensor substrate 930 and an electrical shield 975 underlies the mechanical stress isolation layer 910 at the back side of the ultrasonic fingerprint sensor system 900. In FIG. 9F, the mechanical stress isolation layer 910 may be molded around the ultrasonic fingerprint sensor system 900, where an electrical shield 975 underlies the mechanical stress isolation layer 910 at the back side of the ultrasonic fingerprint sensor system 900. There is no foam backing layer 955. In some implementations, a cavity may be formed in the molded stress isolation material behind the sensor active area to serve as an air backing layer. In the implementations shown in FIGS. 9B-9D, the stiffener 960 may be electrically grounded and serve as an electrical shield. In the implementations shown in FIGS. 9E-9F, the electrical shield 975 may be electrically grounded and serve as a mechanical stiffener.

Figure 10:
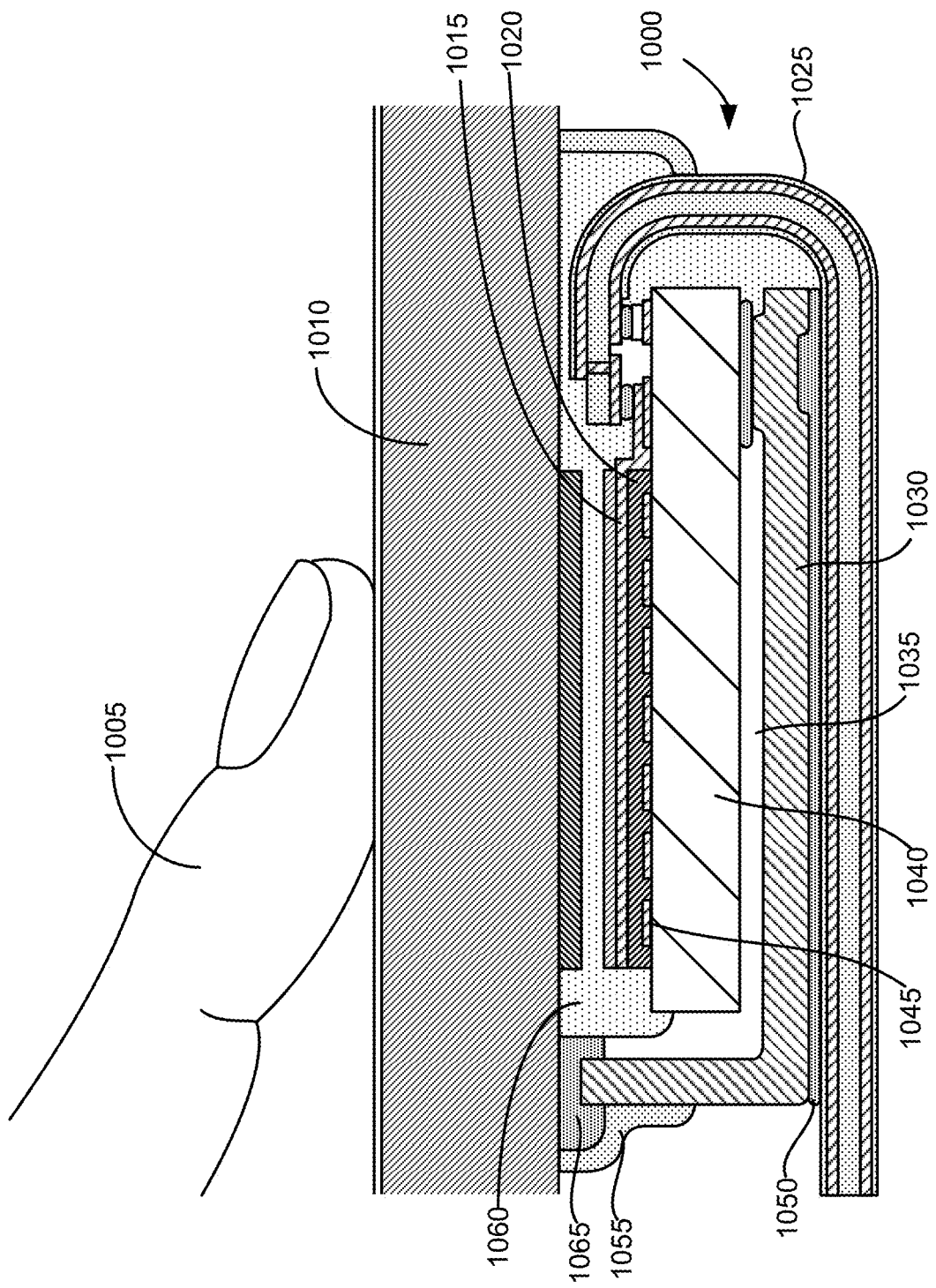
FIG. 10 shows a cross-sectional view of an example under-platen ultrasonic sensor system with a flexible printed circuit (FPC).

FIG. 10 shows a cross-sectional view of an example under-platen ultrasonic sensor system with a flexible printed circuit (FPC). In FIG. 10, an ultrasonic sensor system 1000 is located underneath or underlying a platen 1010. The platen 1010 may be deemed "in front of," "above," or "overlying" the ultrasonic sensor system 1000, and the ultrasonic sensor system 1000 may be deemed "behind," "below," or "underlying" the platen 1010. Such terms as used herein are relative terms depending on the orientation of the device. In some implementations, the ultrasonic sensor system 1000 is coupled to the platen 1010 by a first adhesive 1060. A finger 1005 may press against the platen 1010 to activate the ultrasonic sensor system 1000. In some implementations, the platen 1010 may be a cover glass of a display device (e.g., mobile device). In some implementations, the platen 1010 may include a portion of a display such as an organic light-emitting diode (OLED) or active matrix organic light-emitting diode (AMOLED) display.

The ultrasonic sensor system 1000 may include a sensor substrate 1040, a plurality of sensor circuits 1045 disposed on the sensor substrate 1040, a transceiver layer 1020, and an electrode layer 1015. The transceiver layer 1020 may be referred to as a "piezoelectric layer" or as a "piezoelectric transceiver layer." The electrode layer 1015 may be referred to as a "transceiver electrode layer." In some implementations, the transceiver layer 1020 may correspond to the piezoelectric transceiver layer 456 of FIG. 4B or may correspond to one or both of the piezoelectric receiver layer 436 and the piezoelectric transmitter layer 422 of FIG. 4A. The ultrasonic sensor system 1000 may further include a passivation layer (not shown). Different implementations may use different materials for the sensor substrate 1040. For example, the sensor substrate 1040 may include a silicon substrate, a silicon-on-insulator (SOI) substrate, a thin-film transistor (TFT) substrate, a glass substrate, a plastic substrate, a ceramic substrate, and/or a combination thereof.

The plurality of sensor circuits 1045 may be formed over or on the sensor substrate 1040, such as TFT circuits formed on a TFT substrate or complementary metal-oxide-semiconductor (CMOS) circuits formed on or in a silicon substrate. In some implementations, the transceiver layer 1020 may be positioned over the plurality of sensor circuits 1045. The transceiver layer 1020 may serve as both a transmitter and a receiver of ultrasonic waves, where the transceiver layer 1020 is configured to transmit at least one ultrasonic wave/signal and receive or detect at least one ultrasonic wave/signal. Accordingly, the transceiver layer 1020 may include one or more piezoelectric layers and one or more electrode layers to enable the transceiver layer to transmit and receive ultrasonic waves.

An ultrasonic wave is an acoustic wave that has a frequency above about 20 kHz. In some implementations, ultrasonic waves have a frequency between about 1 MHz and about 100 MHz, such as between about 5 MHz and about 20 MHz. Acoustic waves are longitudinal waves that have the same direction of vibration as their direction of travel. Acoustic waves push particles in a medium, whether the medium is a solid, liquid, or gas. Acoustic waves travel at the speed of sound, which depends on the medium that they are passing through. Acoustic impedance in a material measures the opposition to acoustic flow resulting from an acoustic pressure applied to the material. Acoustic impedance enables determination of the reflection and transmission of acoustic energy at boundaries. If the acoustic impedance of two media is very different, then most acoustic energy will be reflected, rather than transmitted across the boundary. Acoustic impedance may be measured in terms of Pascal-seconds per meter (Pa-s/m or kg/s/m2) with units of Rayls or MRayls.

The plurality of sensor circuits 1045 may include an array of thin-film transistor circuits. For example, the sensor circuits 1045 may include an array of pixel circuits, where each pixel circuit may include one or more TFTs. A pixel circuit may be configured to convert an electric charge generated by the transceiver layer proximate to the pixel circuit into an electrical signal in response to a received ultrasonic wave. Output signals from the sensor circuits 1045 may be sent to a controller or other circuitry for signal processing.

In some implementations, the transceiver electrode layer 1015 may be disposed, positioned, placed, or formed over the transceiver layer 1020. The transceiver electrode layer 1015 may include one or more electrically conductive layers/traces that are coupled to the transceiver layer 1020. In some implementations, the transceiver electrode layer 1015 may include silver ink. In some implementations, the transceiver electrode layer 1015 may include copper. Ultrasonic waves may be generated and transmitted by providing an electrical signal to the transceiver electrode layer 1015. In addition, a passivation layer (not shown) may be disposed, positioned, placed, or formed over at least portions of the transceiver electrode layer 1015. The passivation layer may include one or more layers of electrically insulating material. The sensor substrate 1040 and sensor circuits 1045, the piezoelectric transceiver layer 1020 and the transceiver electrode layer 1015 may be positioned under a platen 1010.

FIG. 10 shows a flexible printed circuit (FPC) 1025 coupled to the sensor substrate 1040. However, it will be understood in the present disclosure that the sensor substrate 1040 may be coupled to a rigid printed circuit board (PCB) or other circuitry. The FPC 1025 may be referred to as a flex tape, flex cable, flex circuit, or simply as "flex." The FPC 1025 may include one or more dielectric layers and one or more interconnects (e.g., traces, vias and pads). In some implementations, the FPC 1025 may be electrically coupled to a controller or other circuitry for signal processing of signals to/from the sensor circuits 1045. In some implementations, the FPC 1025 may wrap around from a front side of the ultrasonic sensor system 1000 to a back side of the ultrasonic sensor system 1000.

In FIG. 10, the ultrasonic sensor system 1000 may be attached to the platen 1010 using a first adhesive 1060 and an edge sealant 1055. The ultrasonic sensor system 1000 may further include a sensor housing or cap 1030 for protecting the ultrasonic sensor system 1000. The sensor housing 1030 may be coupled to a portion of the platen 1010 via a second adhesive 1065 and may be coupled to a portion of the sensor substrate 1040 and to a portion of the FPC 1025 via a third adhesive 1050. In some implementations, the sensor housing 1030 may be largely cantilevered over the active area of the sensor substrate 1040. The sensor housing 1030 may be coupled to the sensor substrate 1040 such that a cavity 1035 is formed between the back side of the sensor substrate 1040 and the sensor housing 1030. In some implementations, the sensor housing 1030 may include one or more layers of plastic or metal. In some implementations, the sensor housing 1030 and the cavity 1035 may allow the interface between the sensor substrate 1040 and the cavity 1035 to operate as an acoustic barrier for the ultrasonic sensor system 1000. In some implementations, the cavity 1035 may provide a space for accommodating an acoustic shielding structure that is configured to absorb, trap, or otherwise attenuate ultrasonic waves. The FPC 1025 may be wrapped around the sensor substrate 1040 and the sensor housing 1030, where the FPC 1025 is attached to a backside of the sensor housing 1030.

An under-platen ultrasonic sensor system 1000 may be provided in a display device as shown in FIG. 10, but an under-display ultrasonic sensor system is not necessarily provided in a display device as in an under-platen ultrasonic sensor system. Accordingly, a display device including an under-display ultrasonic sensor system may be constructed differently than an under-platen ultrasonic sensor system.

Figure 11:
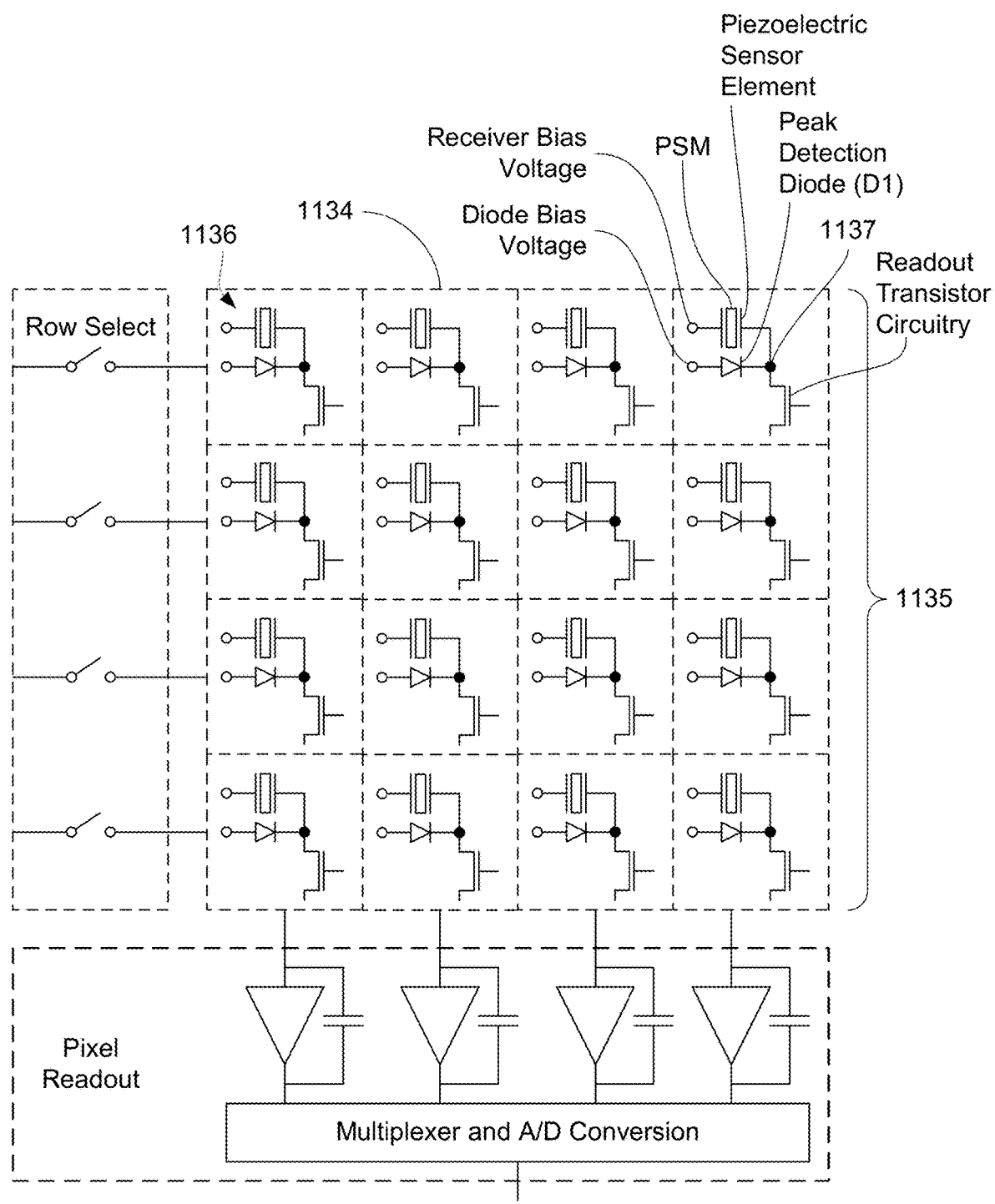
FIG. 11 representationally depicts aspects of a 4×4 pixel array of sensor pixels for an ultrasonic sensor system.

FIG. 11 representationally depicts aspects of a 4×4 pixel array of sensor pixels for an ultrasonic sensor system. Each pixel 1134 may be, for example, associated with a local region of piezoelectric sensor material (PSM), a peak detection diode (D1) and a readout transistor (M3); many or all of these elements may be formed on or in a substrate to form the pixel circuit 1136. In practice, the local region of piezoelectric sensor material of each pixel 1134 may transduce received ultrasonic energy into electrical charges. The peak detection diode D1 may register the maximum amount of charge detected by the local region of piezoelectric sensor material PSM. Each row of the pixel array 1135 may then be scanned, e.g., through a row select mechanism, a gate driver, or a shift register, and the readout transistor M3 for each column may be triggered to allow the magnitude of the peak charge for each pixel 1134 to be read by additional circuitry, e.g., a multiplexer and an A/D converter. The pixel circuit 1136 may include one or more TFTs to allow gating, addressing, and resetting of the pixel 1134.

Each pixel circuit 1136 may provide information about a small portion of the object detected by the ultrasonic sensor system. While, for convenience of illustration, the example shown in FIG. 11 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 12A:
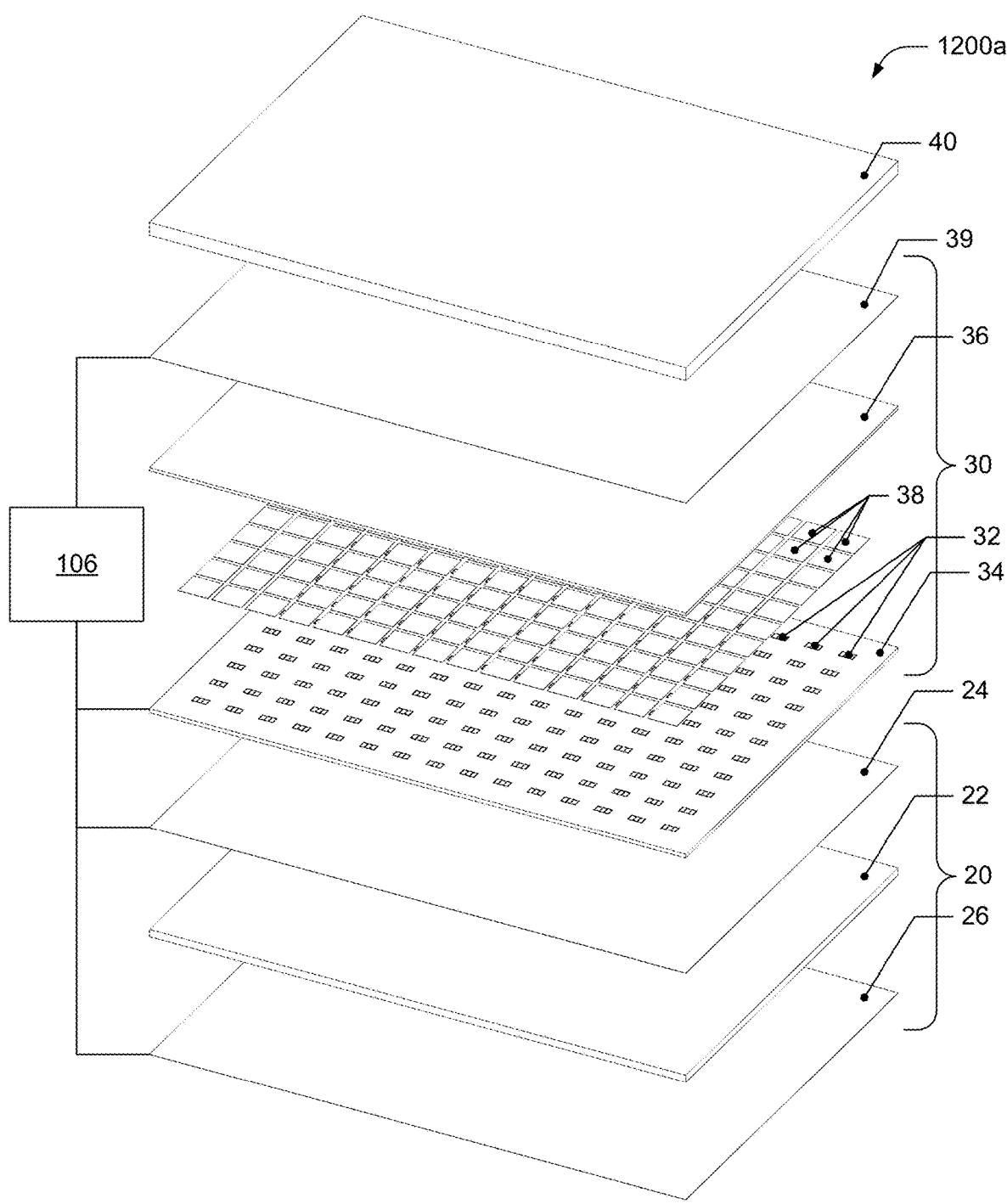
FIG. 12A shows an example of an exploded view of an ultrasonic sensor system.

FIG. 12A shows an example of an exploded view of an ultrasonic sensor system. In this example, the ultrasonic sensor system 1200a includes an ultrasonic transmitter 20 and an ultrasonic receiver 30 under a platen 40. According to some implementations, the ultrasonic receiver 30 may be an example of the acoustic receiver system 102 that is shown in FIG. 1 and described above. In some implementations, the ultrasonic transmitter 20 may be an example of the optional ultrasonic transmitter 108 that is shown in FIG. 1 and described above. However, some implementations of the ultrasonic sensor system 1200a (and some implementations of the ultrasonic sensor system 1200b that is described below with reference to FIG. 12B) do not include the ultrasonic transmitter 20. In some such implementations, the ultrasonic receiver 30 may be configured as an ultrasonic transceiver.

However, in the example shown in FIG. 12A, the ultrasonic transmitter 20 includes a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 106 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be capable of processing the amplified signals received from the sensor pixel circuits 32.

The control system 106 may be capable of controlling the ultrasonic transmitter 20 and/or the ultrasonic receiver 30 to obtain ultrasonic image data, e.g., by obtaining fingerprint images. Whether or not the ultrasonic sensor system 1200a includes an ultrasonic transmitter 20, the control system 106 may be capable of obtaining attribute information from the ultrasonic image data. In some examples, the control system 106 may be capable of controlling access to one or more devices based, at least in part, on the attribute information. The ultrasonic sensor system 1200a (or an associated device) may include a memory system that includes one or more memory devices. In some implementations, the control system 106 may include at least a portion of the memory system. The control system 106 may be capable of obtaining attribute information from ultrasonic image data and storing the attribute information in the memory system. In some implementations, the control system 106 may be capable of capturing a fingerprint image, obtaining attribute information from the fingerprint image and storing attribute information obtained from the fingerprint image (which may be referred to herein as fingerprint image information) in the memory system. According to some examples, the control system 106 may be capable of capturing a fingerprint image, obtaining attribute information from the fingerprint image and storing attribute information obtained from the fingerprint image even while maintaining the ultrasonic transmitter 20 in an "off" state.

In some implementations, the control system 106 may be capable of operating the ultrasonic sensor system 1200a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 1200a is operating in the force-sensing mode. In some implementations, the control system 106 may be capable of controlling other devices, such as a display system, a communication system, etc. In some implementations, the control system 106 may be capable of operating the ultrasonic sensor system 1200a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 5 MHz to 30 MHz, with wavelengths on the order of a millimeter or less.

Figure 12B:
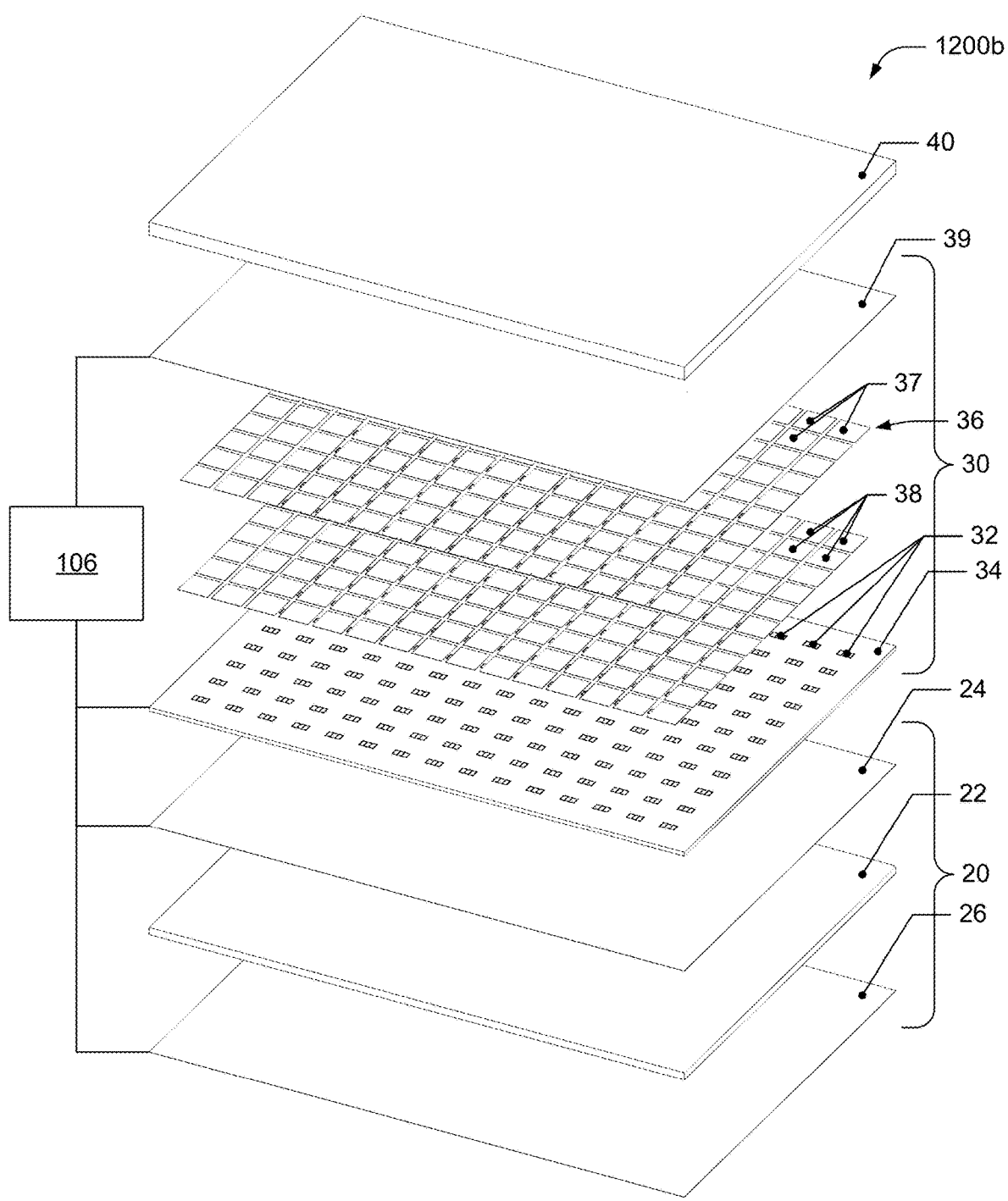
FIG. 12B shows an exploded view of an alternative example of an ultrasonic sensor system.

FIG. 12B shows an exploded view of an alternative example of an ultrasonic sensor system. In this example, the piezoelectric receiver layer 36 has been formed into discrete elements 37. In the implementation shown in FIG. 12B, each of the discrete elements 37 corresponds with a single pixel input electrode 38 and a single sensor pixel circuit 32. However, in alternative implementations of the ultrasonic sensor system 1200b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 12A and 12B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
   an acoustic receiver system configured for receiving dynamic friction acoustic waves produced via relative motion between an outer surface of the apparatus and a target object in contact with the outer surface; and
   a control system including one or more processors, the control system being configured for communication with the acoustic receiver system, the control system being configured for:
      receiving first acoustic signals from the acoustic receiver system, the first acoustic signals corresponding to a first instance of the dynamic friction acoustic waves;
      extracting first target object features from the first acoustic signals, wherein the first target object features comprise fingerprint features; and
      performing a first authentication process based, at least in part, on the first target object features.

2. The apparatus of claim 1, wherein the acoustic receiver system comprises an ultrasonic receiver system.

3. The apparatus of claim 1, wherein the acoustic receiver system comprises a piezoelectric receiver system.

4. The apparatus of claim 1, wherein fingerprint features include one or more of fingerprint minutiae, keypoints, sweat port information, ridge ending information, ridge bifurcation information, short ridge information, ridge flow information, island information, spur information, delta information or core information.

5. The apparatus of claim 1, further comprising a user input device, wherein the acoustic receiver system resides in or on the user input device.

6. The apparatus of claim 1, further comprising a display, wherein the acoustic receiver system resides proximate a first side of the display and wherein the outer surface is proximate a second side of the display.

7. An Internet of things device that includes the apparatus of claim 1.

8. The apparatus of claim 1, further comprising a layer between the outer surface of the apparatus and the acoustic receiver system, the layer comprising one or more of metal, plastic, ceramic or polymer.

9. The apparatus of claim 1, wherein the control system is further configured for controlling access to the apparatus, or to another device, based at least in part on the first authentication process.

10. The apparatus of claim 9, wherein the control system is further configured for:
    receiving second through Nth acoustic signals from the acoustic receiver system, the second through Nth acoustic signals corresponding to second through Nth instances of the dynamic friction acoustic waves;
    extracting second through Nth target object features from each of the second through Nth acoustic signals;
    performing second through Nth authentication processes based, at least in part, on the first target object features; and
    controlling access to the apparatus, or to the other device, based at least in part on the second through Nth authentication processes.

11. The apparatus of claim 1, wherein the apparatus does not include a transmitter corresponding to the acoustic receiver.

12. The apparatus of claim 1, wherein the apparatus includes a transmitter corresponding to the acoustic receiver, but wherein the transmitter is not transmitting during the time the acoustic receiver system is receiving the dynamic friction acoustic waves.

13. A mobile device that includes the apparatus of claim 1.

14. An authentication method, comprising:
    receiving, via an acoustic receiver system of an apparatus, dynamic friction acoustic waves produced via relative motion between an outer surface of the apparatus and a target object in contact with the outer surface;
    receiving, via a control system that includes one or more processors, first acoustic signals from the acoustic receiver system, the first acoustic signals corresponding to a first instance of the dynamic friction acoustic waves;
    extracting, via the control system, first target object features from the first acoustic signals, wherein the first target object features comprise fingerprint features; and
    performing, via the control system, a first authentication process based, at least in part, on the first target object features.

15. The method of claim 14, wherein the fingerprint features include one or more of fingerprint minutiae, keypoints, sweat port information, ridge ending information, ridge bifurcation information, short ridge information, ridge flow information, island information, spur information, delta information or core information.

16. The method of claim 14, wherein the dynamic friction acoustic waves pass through a layer between the target object and the acoustic receiver system, the layer comprising one or more of metal, plastic, ceramic or polymer.

17. The method of claim 14, further comprising controlling access to the apparatus, or to another device, based at least in part on the first authentication process.

18. The method of claim 17, further comprising:
    receiving second through Nth acoustic signals from the acoustic receiver system, the second through Nth acoustic signals corresponding to second through Nth instances of the dynamic friction acoustic waves;
    extracting second through Nth target object features from each of the second through Nth acoustic signals;
    performing second through Nth authentication processes based, at least in part, on the first target object features; and
    controlling access to the apparatus, or to the other device, based at least in part on the second through Nth authentication processes.

19. The method of claim 14, wherein the apparatus includes a transmitter corresponding to the acoustic receiver, but wherein the method involves not causing the transmitter to transmit during the time the acoustic receiver system is receiving the dynamic friction acoustic waves.

20. One or more non-transitory media having instructions stored thereon for controlling one or more devices to perform a method, the method comprising:

receiving, via an acoustic receiver system of an apparatus, dynamic friction acoustic waves produced via relative motion between an outer surface of the apparatus and a target object in contact with the outer surface;

receiving, via a control system that includes one or more processors, first acoustic signals from the acoustic receiver system, the first acoustic signals corresponding to a first instance of the dynamic friction acoustic waves;

extracting, via the control system, first target object features from the first acoustic signals, wherein the first target object features comprise fingerprint features; and performing, via the control system, a first authentication process based, at least in part, on the first target object features.

21. The one or more non-transitory media of claim 20, wherein fingerprint features include one or more of fingerprint minutiae, keypoints, sweat port information, ridge ending information, ridge bifurcation information, short ridge information, ridge flow information, island information, spur information, delta information or core information.

22. The one or more non-transitory media of claim 20, wherein the dynamic friction acoustic waves pass through a metal layer between the target object and the acoustic receiver system.

23. The one or more non-transitory media of claim 20, wherein the method further comprises controlling access to the apparatus, or to another device, based at least in part on the first authentication process.

24. The one or more non-transitory media of 23, wherein the method further comprises:

receiving second through Nth acoustic signals from the acoustic receiver system, the second through Nth acoustic signals corresponding to second through Nth instances of the dynamic friction acoustic waves;

extracting second through Nth target object features from each of the second through Nth acoustic signals;

performing second through Nth authentication processes based, at least in part, on the first target object features; and controlling access to the apparatus, or to the other device, based at least in part on the second through Nth authentication processes.

25. The one or more non-transitory media of claim 20, wherein the apparatus includes a transmitter corresponding to the acoustic receiver, but wherein the method involves not causing the transmitter to transmit during the time the acoustic receiver system is receiving the dynamic friction acoustic waves.

26. An apparatus, comprising:

an acoustic receiver system configured for receiving dynamic friction acoustic waves produced via relative motion between an outer surface of the apparatus and a target object in contact with the outer surface; and control means for:
receiving first acoustic signals from the acoustic receiver system, the first acoustic signals corresponding to a first instance of the dynamic friction acoustic waves;

extracting first target object features from the first acoustic signals, wherein the first target object features comprise fingerprint features; and performing a first authentication process based, at least in part, on the first target object features.

27. The apparatus of claim 26, wherein the acoustic receiver system comprises at least one of an ultrasonic receiver system or a piezoelectric receiver system.

28. An Internet of things device that includes the apparatus of claim 26.

29. The apparatus of claim 26, further comprising a layer between the outer surface and the acoustic receiver system, the layer comprising one or more of metal, plastic, ceramic or polymer.

30. The apparatus of claim 26, wherein the control system is further configured for controlling access to the apparatus, or to another device, based at least in part on the first authentication process.

* * * * *